(12) United States Patent
Fogg

(10) Patent No.: US 10,108,890 B1
(45) Date of Patent: Oct. 23, 2018

(54) SYSTEM AND METHOD FOR PROVIDING PRODUCTS AND LOCATIONS

(71) Applicant: Harold T. Fogg, Aurora, CO (US)

(72) Inventor: Harold T. Fogg, Aurora, CO (US)

( * ) Notice: Subject to any disclaimer, the term of this patent is extended or adjusted under 35 U.S.C. 154(b) by 159 days.

(21) Appl. No.: 15/283,555

(22) Filed: Oct. 3, 2016

Related U.S. Application Data

(62) Division of application No. 13/625,978, filed on Sep. 25, 2012, now Pat. No. 9,489,345.

(51) Int. Cl.
*G06K 19/06* (2006.01)
*G06F 17/30* (2006.01)

(52) U.S. Cl.
CPC . *G06K 19/06046* (2013.01); *G06F 17/30569* (2013.01)

(58) Field of Classification Search
None
See application file for complete search history.

(56) References Cited

U.S. PATENT DOCUMENTS

| | | | |
|---|---|---|---|
| 6,542,933 B1* | 4/2003 | Durst, Jr. | G06F 17/30879 707/999.009 |
| 6,606,718 B1* | 8/2003 | Bessios | H03M 13/2721 714/701 |
| 7,346,564 B1* | 3/2008 | Kirklin | G06Q 10/087 705/26.1 |
| 9,619,774 B2* | 4/2017 | Eckberg | G06Q 10/0833 |
| 2006/0020874 A1* | 1/2006 | Desai | H03M 13/2963 714/780 |

FOREIGN PATENT DOCUMENTS

CN 101777926 B * 4/2014

* cited by examiner

*Primary Examiner* — Tan V Mai
(74) *Attorney, Agent, or Firm* — Shifrin Patent Law; Dan Shifrin

(57) ABSTRACT

A method is provided for providing a product by changing the length of a product code base without changing the number of indexes provided by the base.

10 Claims, 17 Drawing Sheets

| SYMBOLS | b > 1 | b = 1 |
|---|---|---|
| v = Value | v = F + n*(L – F) / (b – 1)<br>801 | v = F |
| n = Index | n = (v – F)*(b – 1) / (L – F)<br>803 | n = 0 |
| b = Base | b = 1 + n*(L – F) / (v – F)<br>805 | b = 1 |
| F = First Value | F = v(0)<br>807 | F = L |
| L = Last Value | L = v(b-1)<br>809 | L = F |

FIG. 8

MIXED BASE NUMBER GUIDE

1. N = LENGTH (BASE)
2. i =1:N
3. Enter Base(1:N)
4. Enter Decimal at Q(N)
5. Calculate and enter Q(i-1) using Q(i-1)= Q(i) / B(i) for i = N : -1 : 2
6. Calculate and enter R(i) using R(i) =Q(i) - B(i) * Q(i-1) for I = N : -1 : 2   and R(1) =Q(1)
7. Set MIX = Mixed Base Number = Remainder R.
8. Calculate and enter W(i) for i = N : -1: 1 using W(N)=1 and W(i-1)=W(i) * B(i) for i=N:-1 :2
9. Calculate Y = MIX * W
10. Verify Decimal =Sum(Y) = Decimal entered at Q(N)

SYSTEM AND METHOD FOR PROVIDING PRODUCTS AND LOCATIONS

RELATED APPLICATION DATA

The present application is a divisional application of commonly-owned and co-pending U.S. patent application Ser. No. 13/625,978, entitled SYSTEM AND METHOD FOR PROVIDING PRODUCTS AND LOCATIONS, filed on Sep. 25, 2012, which application is incorporated herein by reference in its entirety. U.S. Pat. No. 6,038,578, entitled METHOD AND SYSTEM FOR GENERATING A SERIES OF WAVEFORM DEFINITIONS, is also commonly owned and incorporated by reference in its entirety.

TECHNICAL FIELD

The claimed invention relates generally to organizing items or products and, in particular, to providing a code by which the location of a product may be determined from the identity of the product and the identity of a product may be determined from the location of the product.

BACKGROUND ART

When working with the production of items or products, or an inventory of existing items or products, it is important to be able to identify the individual products and locate each. The larger the inventory, the more difficult it can be to manage and becomes even more important to determine where a particular product is located as well as to be able to determine what product is in a particular location. The products may be, for example, automobiles being manufactured, in a lot waiting to be shipped, or in a dealer's lot waiting to be sold. For automobiles, it is important to be able to identify each individual automobile by its characteristics, such as the color of its exterior; the color of its interior; the seat material; whether it has a sun roof, a moon roof, or a plain roof; whether it is a convertible or a hard top; what the amenities are; and many others. Furthermore, during the manufacture of an automobile, it is important to know where it is on the production line. After the automobile has been assembled, it is important to know where on the shipping lot it is so that it can be routed to the proper destination. And, after the automobile has arrived at its destination dealer, it is important for the dealer to know where on the lot it is so that a prospective buyer may see and test drive it. A dealer, with its relatively small inventory, may be able to identify an automobile or its location from a simple computer or printed list. However, as the number of automobiles gets larger, it may become more difficult to manage the inventory from a simple list.

Another application, suggested by the referenced U.S. Pat. No. 6,038,578, pertains to generating a series of waveform definitions. As discussed in the Background of the Invention (column 1, lines 11-36):

There exist a variety of electronic devices that receive a signal in the form of an analog wave and then process the waveform signal to obtain a desired result. In particular, the devices may monitor the received waveform signals by recording the waveforms. An electrocardiograph, which monitors electrical signals produced by a beating heart, is an example of such a device. Another example is a device that monitors light waves transmitted in an optical fiber. Another example is a voltage monitor that monitors the power transmitted in a wire.

The devices also may monitor the received waveform signals by comparing the waveforms to defined waveforms and producing a desired result when an abnormal waveform is detected. For example, an implanted cardiac pacer produces the stimulating voltage pulse when it detects a heart arrythmia [sic]. A heart monitor alerts medical personnel in the same event.

A waveform signal monitor that does not function properly can cause serious consequences. An improperly functioning biological waveform signal monitor, such as an electrocardiograph, cardiac pacer or heart monitor, can be fatal. Therefore, devices have been developed to test and calibrate waveform signal monitors. These devices produce waveform signals that simulate signals that are expected to be monitored.

The owner or operator of such a signal monitor may have a large number of such waveforms to choose from and, therefore, may find it helpful to be able to locate one or more waveforms having desired characteristics or to determine the characteristics of waveforms in particular locations.

SUMMARY OF THE INVENTION

In one embodiment, a method is provided for providing a product by changing the length of a product code base without changing the number of indexes provided by the base.

BRIEF DESCRIPTION OF THE DRAWINGS

FIG. 8 is a table of symbol definitions used to mathematically relate indexes and values;

DETAILED DESCRIPTION OF THE PREFERRED EMBODIMENT

Figure 1A:
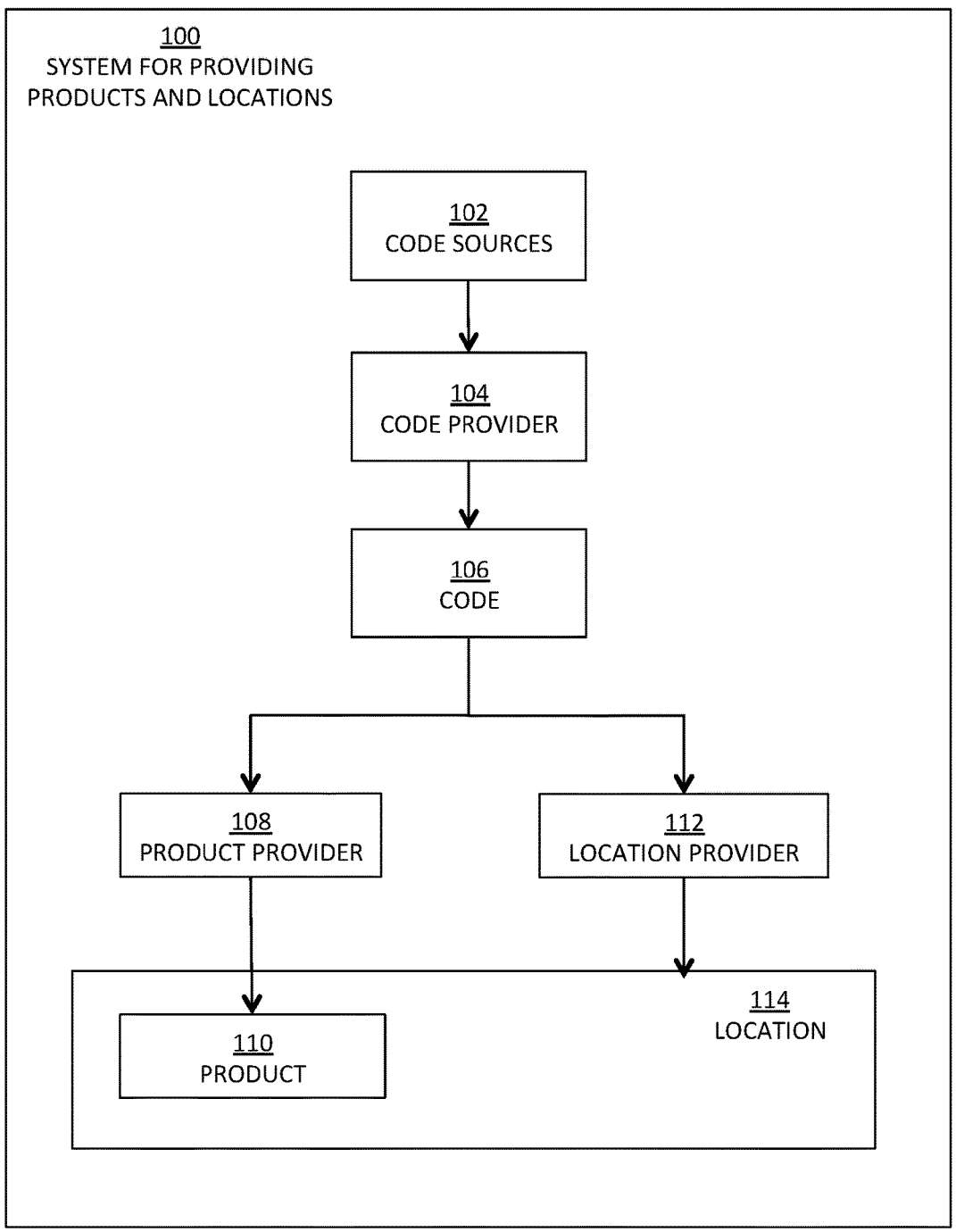
FIG. 1A is a block diagram of an embodiment of a system of the present invention for providing products and locations.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Definitions

To aid in understanding the present invention, the following list of terms and their meanings is included. The meaning of the terms, as set forth below, is the intended meaning whenever the term is used herein, unless another meaning is believed to be clear from the context.

Alpha Digit: Any one of the fifty-two upper and lower case letters in the English alphabet used to represent integers from zero through fifty-one where the lower case letters "a" through "z" represent zero through twenty-five and the upper case letters "A" through "Z" represent the numbers twenty-six through fifty-one. Used to represent digits in numbers having number bases up to fifty-two (see TABLE I, Digit, Negative Alpha Numeral).

TABLE I

Relations Between Alphabetic Symbols and Positive and Negative Decimal Numerals

| LOWER CASE | | UPPER CASE | | |
|---|---|---|---|---|
| Alpha Symbol | Positive Decimal | Alpha Symbol | Alternate Positive Decimal | Alternate Negative Decimal |
| a | 0 | A | 26 | 0 |
| b | 1 | B | 27 | −1 |
| c | 2 | C | 28 | −2 |
| d | 3 | D | 29 | −3 |
| e | 4 | E | 30 | −4 |
| f | 5 | F | 31 | −5 |
| g | 6 | G | 32 | −6 |
| h | 7 | H | 33 | −7 |
| i | 8 | I | 34 | −8 |
| j | 9 | J | 35 | −9 |
| k | 10 | K | 36 | −10 |
| l | 11 | L | 37 | −11 |
| m | 12 | M | 38 | −12 |
| n | 13 | N | 39 | −13 |
| o | 14 | O | 40 | −14 |
| p | 15 | P | 41 | −15 |
| q | 16 | Q | 42 | −16 |
| r | 17 | R | 43 | −17 |
| s | 18 | S | 44 | −18 |
| t | 19 | T | 45 | −19 |
| u | 20 | U | 46 | −20 |
| v | 21 | V | 47 | −21 |
| w | 22 | W | 48 | −22 |
| x | 23 | X | 49 | −23 |
| y | 24 | Y | 50 | −24 |
| z | 25 | Z | 51 | −25 |

TABLE I-continued

Relations Between Alphabetic Symbols and Positive and Negative Decimal Numerals

Alpha Numeral: One or more alpha digits used in representing numbers having bases up to fifty-two (see Alpha Digit, Negative Alpha Numeral).

Attribute: A characteristic, property, specification, or component part of a product used by a product provider along with system provided information to provide a product.

Attribute Instance: A particular case of an attribute. For example, consider a shape defined in an x-y plane by a set of N points; each point is defined by an attribute instance of the attributes x and y, where x and y represent the coordinates of the points. There are N instances of each attribute represented by $x(1:N)$ and $y(1:N)$. The notation $x(1:N)$ means the same as: $x(1), x(2), \ldots x(N)$. The notation $(1:N)$ is read as "1 to N" and means $1, 2, \ldots, N$.

Base: (see Number Base).

Book: A group or collection of one or more pages that may include illustrations, words, symbols, and coded instructions. Used to represent a structure in which locations are identified by sub-structures represented by parameters such as page, row, and column.

Book Code: A code used to provide one or more books.

Catalog: A list or record of the contents of a book, a library or a group of libraries arranged according to a specified system.

Code: An array or subscripted variable that represents information used to identify and provide products. A product code has four types of related meanings; namely, code attribute, code base, code index, and code value.

Code Attribute: A code that represents attribute instances used to identify and provide products.

Code Base: A code that defines the number of states for each member of a code attribute. Each member of a code base is an integer greater than zero.

Code Index: An integer provided from a code base that provides a sequence of consecutive indexes from zero to a number one less than the base. Alternate meanings may be useful, such as specifying a minimum index other than zero to provide a maximum index equal to the minimum index plus the base minus one. Specifying a minimum index other than zero is generally avoided herein because of the complications it causes, particularly in converting number representations in one number base to a different base.

Code Value: A number provided from an index by an index to value control function and which provides an index from a value to index control function. A code value is a number used most directly by a product provider to provide a product.

Control Function: Used for converting an Index to a Value, the inverse of which converts a Value to an Index. Typically, each Code member will have a separate control function for the conversion; thus, a Product code with six members will have six independent control functions. Often the control function are of the linear form Value=Slope*Index+First Value, and for Slope not equal to zero, the inverse control function is: Index=(Value−First Value)/Slope.

Decimal Digit: One of the ten characters 0, 1, 2, . . . , 9 used in representing decimal numbers and other numbers having a base less than ten.

Decimal Numeral: One or more decimal digits used to represent numbers in the decimal number system (see Alpha Numeral).

Digit: A symbol, generally a single character, used in representing numbers. In the decimal system, ten characters are used: 0, 1, 2, 3, 4, 5, 6, 7, 8, and 9. For number systems requiring more than ten unique digits, it is common to define more single character symbols. For number bases larger than about fifty, the advantage of single character symbols to represent digits is decreased by the difficulty of learning symbols not commonly associated with number representations. The decimal system is convenient for defining multi-symbol digits because it is so easy to determine the name and number represented by decimal numbers. For example, rather than define a single symbol for a digit that represents "one-hundred-seven", it is easier to define the decimal equivalent multi-character symbol "107", and use it as a digit in any number base greater than "one-hundred-seven" (see Alpha Digit, Decimal Digit).

FSy: Also yFS, an abbreviation for "full scale value of y."

Index: An integer provided from a number base. Unless otherwise specified herein, an index ranges from a minimum integer of zero to a maximum integer of base minus one.

iCode: A code used to provide an interpolation method. Abbreviation for Interpolation Code (see Interpolation, Interpolation Code).

Index Label: A label that identifies an index.

Interpolation: A process used to define, estimate or find intermediate values for terms between terms having known values. Also, used to define a path from one point to a next point (see iCode).

Interpolation Code: A code used to provide an interpolation method. Interpolation is used for determining undefined points between points defined in a Shape Code. An iCode defines the interpolation method used to determine the path to be taken from a defined point to the next point, even when the next point is not yet defined. The type of interpolation method may vary between sequences of shapes, between shapes within a sequence or even between points in the same shape (see iCode, Interpolation).

Library: A location or place containing books, products, recordings, computer software, or other items arranged and cataloged in a specified way.

Location: A special kind of product where a product is or could be located. Locations are commonly identified by coordinates representing places such as country, state, city, street, avenue, building, library, floor, cabinet, shelf, book, page, row, column, cell, etc. Locations may also be identified by position in computer memory devices.

Location Code: A code used to provide a location.

Mixed Base Number: A multi-position number where the number base of each position is independent of the base defined for other positions (see Number Base, Number Representation).

Negative Alpha Numeral: An alternate Alpha Numeral for representing negative numbers with upper case letters from the English alphabet. "A" through "Z" are used to represent zero through negative twenty-five. Helpful in avoiding minus signs in code values (see TABLE I and Alpha Numeral).

Number Base: The number of digits available for each position of a positional number system. Each digit represents a unique state. The Base for a position in a number is equal to the number of states for that position. TABLE II lists representations of some decimal numbers in other number bases. In a mixed base system, each position of the number has a number of digits independent of the number of digits in other positions (see Digit, Number Representation).

Number Name: The English language name of a number, such as one, two, ten, one hundred, etc. A number's name is independent of the representation of the number (see Number Representation).

TABLE II

Representations of some Decimal Numbers in other Number Bases.

| Decimal Ten | Alphabetic Twenty Six | Binary Two | Octal Eight | Mix Base [2 1 3 3] |
|---|---|---|---|---|
| 0 | a | 0000 | 0 | 0000 |
| 1 | b | 0001 | 1 | 0001 |
| 2 | c | 0010 | 2 | 0002 |
| 3 | d | 0011 | 3 | 0010 |
| 4 | e | 0100 | 4 | 0011 |
| 5 | f | 0101 | 5 | 0012 |
| 6 | g | 0110 | 6 | 0020 |
| 7 | h | 0111 | 7 | 0021 |
| 8 | i | 1000 | 10 | 0022 |
| 9 | j | 1001 | 11 | 1000 |
| 10 | k | 1010 | 12 | 1001 |
| 11 | l | 1011 | 13 | 1002 |
| 12 | m | 1100 | 14 | 1010 |
| 13 | n | 1101 | 15 | 1011 |
| 14 | o | 1110 | 16 | 1012 |
| 15 | p | 1111 | 17 | 1020 |
| 16 | q | 10000 | 20 | 1021 |
| 17 | r | 10001 | 21 | 1022 |

Number Representation: One or more symbols or signals used to represent a number.

The number "five" is represented by the decimal digit "5," by the alpha digit "f," and by the binary numeral "101." In positional number systems, numbers are represented by predefined digits and number bases. Some representations of the number fourteen are:

"14" in decimal from (1*10+4*1)

"1110" in binary from (1*8+1*4+1*2+0*1)

"E" in hexadecimal by digit definition.

"o" in Lower Case Alpha Digits by digit definition.

"24" in Base Five from (2*5+4*1).

"4002" in Mixed Base"5 1 1 3" from (4*3+0*3+0*3+2*1) or by noticing that the number is the maximum for the Base and, thus, is one less than the maximum of fifteen (5*1*1*3) unique numbers for the Base.

Numeral: One or more symbols used to represent a number. The number four is represented by the binary numeral "100," the decimal digit "4," the alpha digit "e," and the Roman numeral "IV." A single symbol numeral, usually a digit, represents the number predefined for that symbol. A multi-symbol numeral represents a number defined by a predefined number base (mixed or conventional) and predefined digit symbols (see Number Representation).

Page Code: A code used to provide a page.

Product: An item that is received, produced or provided including articles of manufacture, items, shapes, books, waveforms, locations, locations for other products, etc.

Product File: A sequence of numbers used to produce products defined by the numbers.

Rows: Plural of row and also an abbreviation that means "number of rows." For example, the statement: Rows=11, means "the number of rows equals eleven."

Sequence: An ordered succession of one or more items that are identified by consecutive integers.

Shape: Something such as a mold or pattern used to give or determine form.

Shape Code: A code used to provide a shape.

Shape File: A sequence of numbers used to produce products having shapes defined by the numbers (see Product File).

Signal: Anything that conveys information.

Signal Generator: A product that generates signals according to control settings or commands. Examples include physiological signal simulators, arbitrary waveform generators (AWG), arbitrary function generators, arbitrary signal generators, and function generators.

Sub Code: Members of a code corresponding to a common attribute, such as xCode, yCode, zCode, iCode, Row Code, Column Code, Page Code, Book Code, etc.

Value Label: A label that identifies values.

Waveform: A graph or illustration obtained by plotting values of one quantity against another quantity, and sometimes refers to an electrical signal and may mean the same thing.

xCode: A code used to provide x-coordinates.

xLabel: A label used to identify parameters related to "x."

xyCode: A combination of an xCode and a yCode in a merged member format, i.e. "$x_1 \ y_1 \ x_2 \ y_2 \ \ldots \ x_N \ y_N$," where x and y are used to provide x-y coordinates.

xValue: xCode members representing value information for the x coordinate attribute of a shape.

yFormat: Defines location control parameters for each position of the yCode.

yCode: A code used to provide y-coordinates.

yIndex: A yCode member representing index information for the y coordinate attribute of a shape.

yLabel: A label used to identify parameters related to "y."

yValue: A yCode member representing value information for the y coordinate attribute of a shape.

zCode: A code used to provide z-coordinates.

zIndex: A zCode member representing index information for the z coordinate attribute of a shape.

zValue: A zCode member representing value information for the z coordinate attribute of a shape.

A block diagram of a system 100 for providing products and locations is shown in FIG. 1A. As previously noted, a "product" may be any item that is received, produced or provided, including articles of manufacture, items, shapes, books, waveforms, locations, locations for other products, etc. And, a "location" is a special kind of product that may be any place where a product is or could be located including, but not limited to, on or in computer storage memory or media. Communication and control in the system 100 is represented by lines enclosing code sources 102, code provider 104, code 106, product provider 108, product 110, location provider 112, and location 114. Code sources 102 are input to code provider 104 which outputs code 106. Both product provider 108 and location provider 112 receive code 106 as input. Product provider 108 provides product 110 from code 106. Location provider 112 provides location 114 from code 106. Notice that both product 110 and location 114 may be derived from a single code 106. Code 106 may be a product code optimized for simplicity in producing product 110, or Code 106 may be a location code optimized for simplicity in producing location 114. A code optimized for providing a product may increase the operations performed by location provider 112 to provide location 114. Similarly, a code optimized for providing a location may increase the operations performed by product provider 108 to provide product 110. Nonetheless, both product 110 and location 114 may be provided from code 106.

There may be many code sources 102 from which code 106 is provided by code provider 104. For example, initial code information may be entered manually by a user of the system 100 or may be generated by the system 100 itself based on entered parameters. There may also be many types of codes that may be output from code provider 104. Because products and locations are provided from the same code 106, the system provides a location 114 for every product 110 and a product 110 for every location 114.

Four types of product code and four types of location code that are used herein include: code attribute, code base, code index, and code value. The members of a product code attribute are names or symbols that represent the attributes from which the system 100 provides products. Similarly, the members of a location code attribute are names or symbols from which the system 100 provides locations.

The members of a code base, a code index, and a code value are numbers, and product codes and location codes for these three types of codes are permutations of each other. A code base contains only integers greater than zero. A code index contains only non-negative integers. A code value is often created to be an integer or a ratio of two integers, but for computational purposes a code value is considered to be a real number.

A product code value (or "product value") is used by a product provider in conventional ways or in other ways known to the user to provide a product. Similarly, a location code value (or "location value") is used by a location provider in conventional or other ways known to the user to provide a location.

Figure 1B:
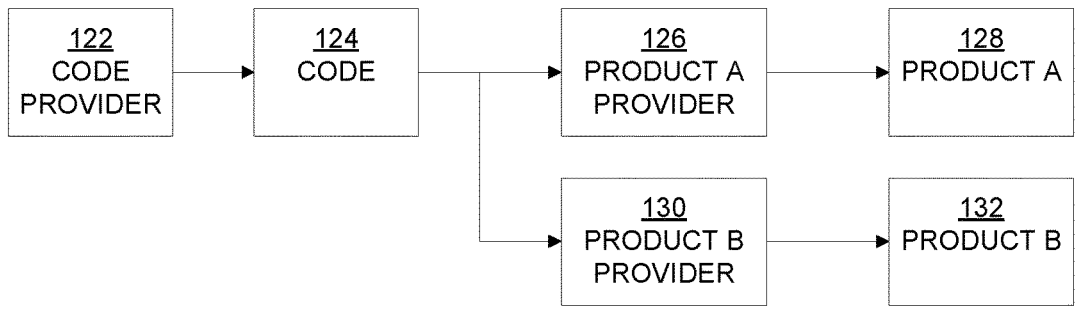
FIG. 1B is a block diagram of an embodiment of the system of FIG. 1A in which two different products are provided.
Figure 1C:
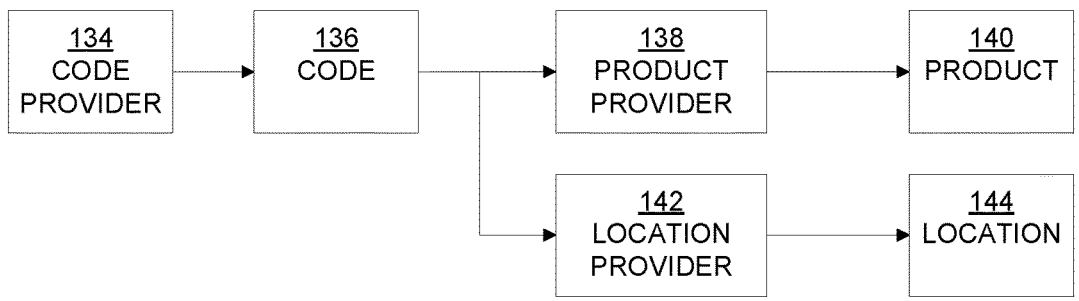
FIG. 1C is a block diagram of an embodiment of the system of FIG. 1A in which a product and a location are provided.

FIG. 1B is a block diagram in which a first product and a second product, different from the first, are provided. Code provider 122 provides code 124 which is output to both product provider A 126 and product provider B 130. Product A provider provides product A 128 and Product B 130 provider provides product B 132. In a particular example, product A 128 might represent the product 110 shown in FIG. 1A and product B might represent the location 114. In this example, the location is considered to be a particular kind of product, as illustrated in the block diagram of FIG. 1C where a product 140 and a location 144 are provided from the same code 136. A code provider 134 provides code 136 which is output to both product provider 138 and to location provider 142. Product provider 138 provides the product 140, and location provider 142 provides the location 144.

Figure 1D:
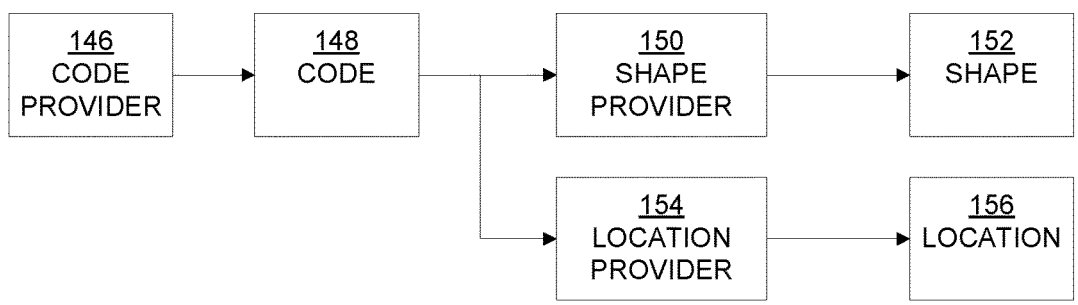
FIG. 1D is a block diagram of an embodiment of the system of FIG. 1A in which a shape and a location are provided.

Particular types of products well suited for this invention are shapes, such as waveforms, and collections of shapes arranged in locations identified by book, page, row, and column. FIG. 1D is a block diagram illustrating a method for providing a shape and a location. Code provider 146 provides code 148 which is output to both shape provider 150 and location provider 154. Shape provider 150 provides a shape 152, and location provider 154 provides a location 156.

Figure 2A:
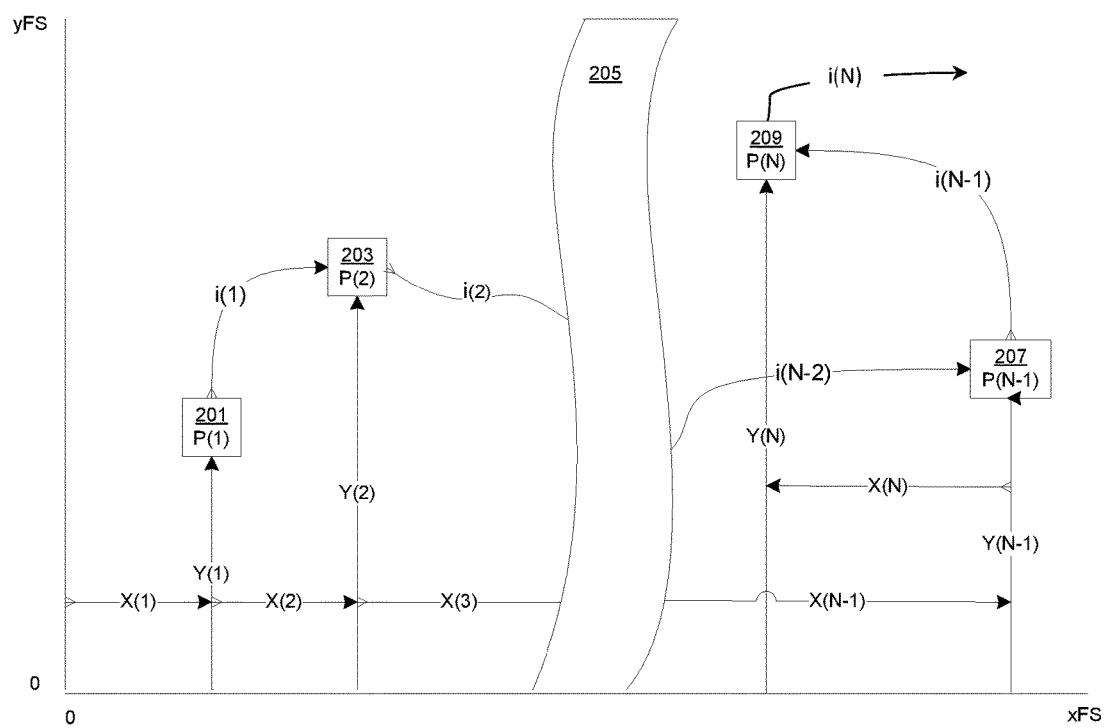
FIG. 2A illustrates a method for providing a shape from a specification of N points.

FIG. 2A illustrates a method for providing a shape from a specification of N points. These N points are commonly called break points or knots. The break points are represented by $P_1$ 201, $P_2$ 203, $P_{N-1}$ 207, $P_N$ 209, and space 205 representing points between $P_2$ and $P_{N-1}$. In the FIG., $X_1$, $X_2$, $X_3$, and $X_{N-1}$ each indicates a distance to the right and, thus has positive values. $X_N$ indicates a distance toward the left (from $P_{N-1}$ to $P_N$) and, thus it has a negative value. By default, y-values and i-values are only positive or zero, not negative, unless otherwise specified. Beginning with quadrant 1 of an xy-rectangular coordinate system, the y-axis is scaled from 0 to y-full scale as represented by yFS, and the x-axis is scaled from 0 to x-full scale as represented by xFS.

Break point $P_1$ 201 is identified by its horizontal distance $x_1$ from the y-axis and its vertical distance $y_1$ from the x-axis. Also, $P_1$ is assigned an interpolation value, $i_1$, that represents an interpolation method to be used for defining the path to the next point $P_2$ 203. In one embodiment, $x_1=0$ so the shape begins with a point on the y-axis.

The position for $P_2$ 203 is defined by $x_2$ as its horizontal distance from $P_1$ and by $y_z$ its vertical distance from the x-axis. The path to the next break point is defined by $i_z$, even though, in this example, the next point $P_3$ is not yet specified or revealed.

In one embodiment, the value of $x_2$ represents the horizontal distance from the previous break point, and not the horizontal distance from a pre-defined reference, such as the y-axis. Therefore, the location of $P_2$ defined by $x_2$ and $y_2$ would be represented in a more conventional form by $(x_1+x_2, y_2)$.

Using three preferred methods of defining shapes herein, break points are defined using a format of either "xy, i", "xyi", or "x, y, i". As an example for a shape defined by two points, consider an xy, i representation "2k3u, bb" where $x_1=2$, $x_2=3$, $y_1=k$, $y_2=u$, and $i_1=i_2=b$. An xyi representation of the same shape is "2kb3ub." An "x,y,i" representation is "2 3, ku, bb." As described more fully herein, the default method of defining shapes uses decimal numerals to represent x-values, but alpha numerals to represent y-values and i-values. Using alpha numerals defined herein, lower case letters from the English alphabet are used to represent decimal numerals from 0 to 25. In other words, a=0, b=1, ..., k=10, ... u=20, ..., z=25. Upper case letters may be used in two ways: by default to represent decimals from twenty-six to fifty-one, or when otherwise defined, to represent the negatives of the lower case letters.

In more conventional notation, the shape "2k3u, bb" may be represented by two break points, one at (2, 10) and one at (5, 20) with a statement of an interpolation method that defines points, on a path from each break point to the next. One advantage of using alpha numerals to represent y-values and i-values is that their use often avoids the need to use extra symbols for delimiting. Specifically, it is convenient to visually or automatically distinguish between the values of the attribute instances used to define shapes and many other products, as well. In one embodiment, the y-values and i-values are limited to 52 values each, so the values are conveniently defined by integers from 0 to 51 and represented by alpha numerals 'a' to 'z' and 'A' to 'Z'. It is interesting that alpha numerals using both upper and lower case letters may represent numbers with a step resolution of 5 in a range from 0, 5, 10, to 255, which is the range of integers provided by an 8-bit binary code.

If it is inconvenient to use alpha numerals to represent numbers, extra symbols for delimiting may be used. Normally, these extra symbols are not used because x-values can be any decimal representation suitable for the system, and the fifty-two states represented by alpha numerals for y-values and i-values are often enough.

As previously disclosed, four types of product codes are used to provide products: attribute, base, index, and value. For shapes, the attributes are x, y, and i. There is one instance of each attribute for each break point. In the previous example, where a shape is defined with two break points, the x-attribute instances are $x_1$, $x_2$, the y-attribute instances are $y_1$, y2, and the i-attribute instances are $i_1$, $i_2$.

To provide a sequence of shapes, a number of states for each attribute instance may be defined by a code base. The code base provides an index code sequence which provides a code value sequence from which a shape sequence is provided by a shape value to shape provider. For example the code base bX=[1 1] defines one state for each of the two x-attribute instances. The code base bY=[3 3] defines three states for each of the two y-attribute instances. The code base bI=[1 1] defines one state for each of the two i-attribute instances. In this case if the code base for a shape sequence is bS=[bX bY bI], then bS=[1 1 3 3 1 1]. The base bS thus provides a sequence of nine indexes from [0 0 0 0 0 0] to [0 0 2 2 0 0] using a base to index provider, represented by the symbol b2n. This index sequence contains nine different y-indexes, but the x-indexes and the i-indexes remain constant at zero. For purposes of the description and claims herein, "sequence" is considered to include one or more items.

If an index to value function is defined as v(n)=2*n, the y-indexes, nY, and y-values, vY, are as follows:
nY=[00 01 02 10 11 12 20 21 22]
vY=[00 02 04 20 22 24 40 42 44].

Figure 2B:
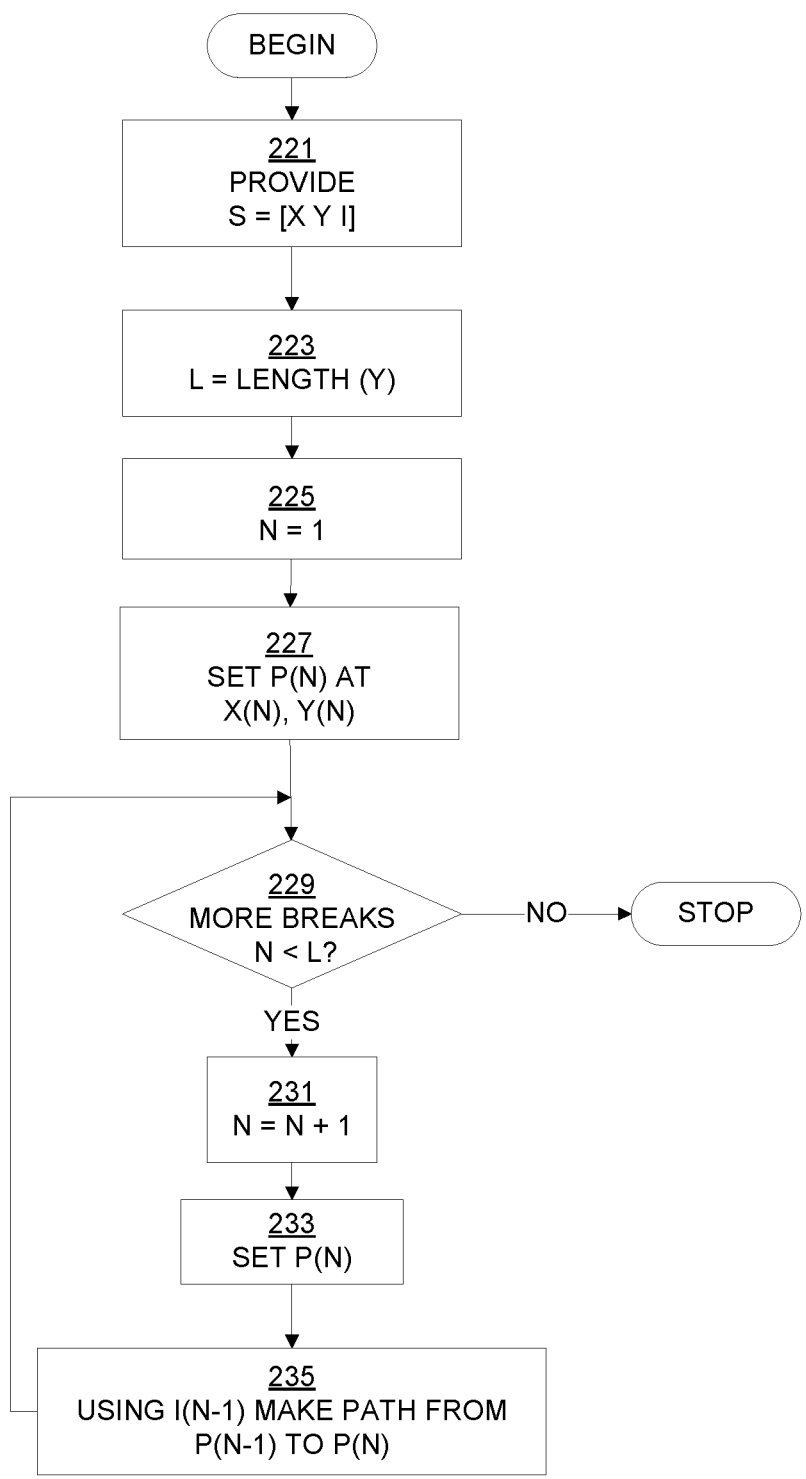
FIG. 2B is a flow chart of a method for providing a shape from a shape code value.

FIG. 2B illustrates a flow chart of the operation of a method for providing a two-dimensional shape from a shape code value. In block 221, the shape code value is provided as S=[X Y I], where X represents the x-value, Y represents the y-value, and I represents the i-value. In block 223, the length L of the y-value is determined. By definition, the length of the code equals the number of members in the code. The members of the code are represented by "subscripted" variables so that $X_N$ represents the Nth member of the x-value, $Y_N$ represents the Nth member of the y-value, and $I_N$ represents the Nth member of the i-value. Also, $P_N=X_N Y_N I_N$ represents the break point at the position defined by $X_N$ and $Y_N$. The i-value for $P_N$ represents the interpolation method used to define the path from $P_N$ to the next break point, $P_{N+i}$ whereas the path from $P_{N-1}$ to $P_N$ is defined by $I_{N-1}$. Thus, the i-value for a break point defines the path to the next break point regardless of whether the next break is defined. In some embodiments, the shape code value S may be a three-dimensional shape S=[X Y Z I], with Z representing the z-value depth. In such situations, $P_N=X_N Y_N Z_N I_N$ represents the break point at the position defined by $X_N$, $Y_N$, $Z_N$ and $I_N$ again representing the interpolation method used to define the path from $P_N$ to the next break point, $P_{N+1}$.

In block 225, the system sets N=1. Then in block 227, break point $P_1$ is set at $X_1$ and $Y_1$. In general, $P_N$ is set at $X_N$, $Y_N$. In decision block 229, the system determines whether more break points are to be set by comparing the current break point number, N, with L, the length of the y-value, which is the same as the total number of break points. If N is not less than L, the process stops, indicating that all break points have been set and the shape is complete. If N is less than L, N is replaced by N+1, as shown in block 231 and the new break point, $P_N$, is set as shown in block 233. It will be understood that when each breakpoint $P_N$ is defined by three variables, such as $X_N$, $Y_N$, $I_N$, the total length of $P_{1:L}$ is equal to 3*L.

In block 235, the system uses $I_{N-1}$ to make the path from $P_{N-1}$ to $P_N$. The steps from block 231 through block 235 are then repeated until it is determined at decision block 229 that the shape is complete and the process ends. In the following text, the system and method for providing products is described for products in general as well as for shapes as previously described. It is believed, however, that understanding how the system provides shapes is helpful in understanding how the system provides other products.

Figure 3:
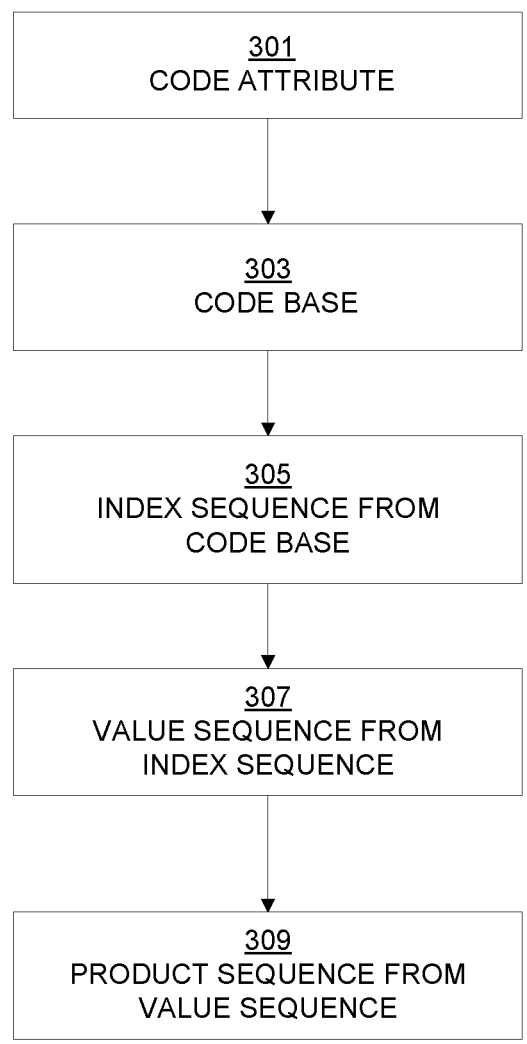
FIG. 3 is a flow chart of a process of providing a product sequence from a product code attribute.

Generalizing from the previous description of defining break points of a shape sequence, FIG. 3 illustrates how a product sequence is provided from a process that begins with a product code attribute. Code attribute 301 is an ordered list of code attribute instances. It is understood that a code attribute may be a list or a vector of one or more attribute instances. Unless otherwise specified, the phrase "code attribute" is intended to have the same meaning as the phrase "attribute code." A code base 303 is provided to define a number of states for each member of the attribute code. An index sequence 305 is provided from the code base 303. A value sequence 307 is provided from the index sequence 305, and a product sequence 309 is provided from the value sequence 307.

As shown at the top of FIG. 3, code attribute 301 is received and for each member of the code a number of states is defined by code base 303. The number of states is an integer greater than zero and the number for each member is independent of the number of states for any other member. This type of base is called a mixed base, and the numbers provided from it are called mixed base numbers. From code base 303, an index sequence 305 is provided. Next, a value sequence 307 is provided from the index sequence 305. Finally, a product sequence 309 is provided from the value sequence 307.

Figure 4:
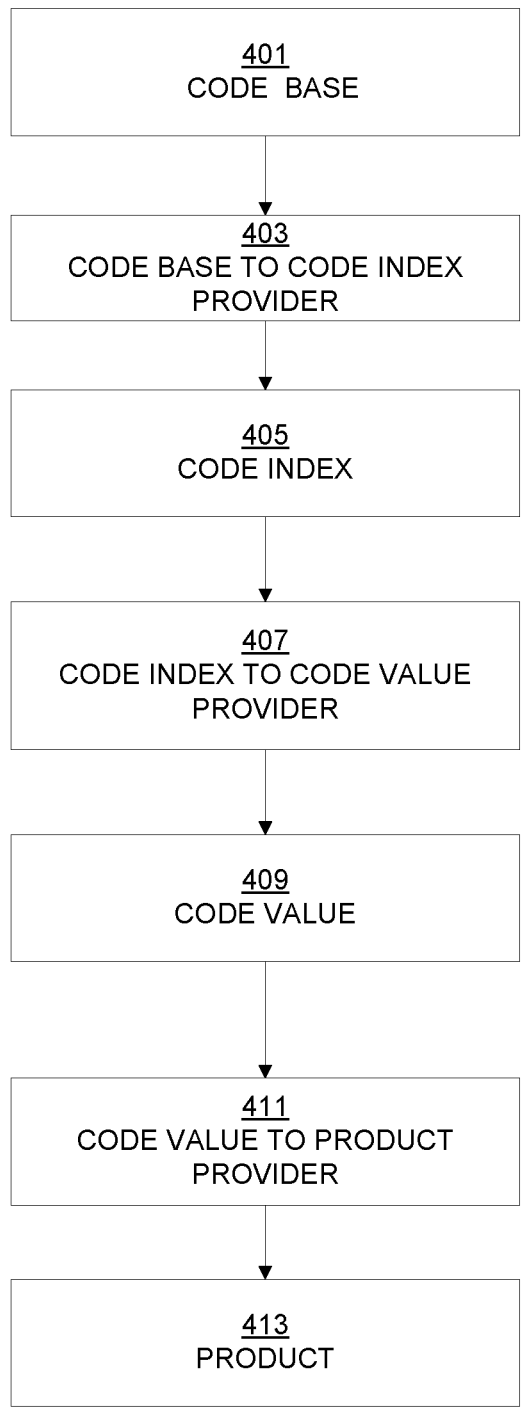
FIG. 4 is a flow chart of a more detailed process of providing a product sequence from a product code base.

In FIG. 4, a diagram illustrates with more detail than FIG. 3 a process for providing a one product 413 (in contrast to FIG. 3 in which more than one product is provided). Beginning at the top, a code base 401 defines a number of states for each member of a code, as described for code base 303 in FIG. 3. Code base 401 is input to a code base to code index provider 403, which provides code index 405 as the output. Code index to code value provider 407 takes code index 405 as an input and provides code value 409 as the output. Finally, code value to product provider 411 takes code value 409 as an input and provides product 413 as the output.

Figure 5:
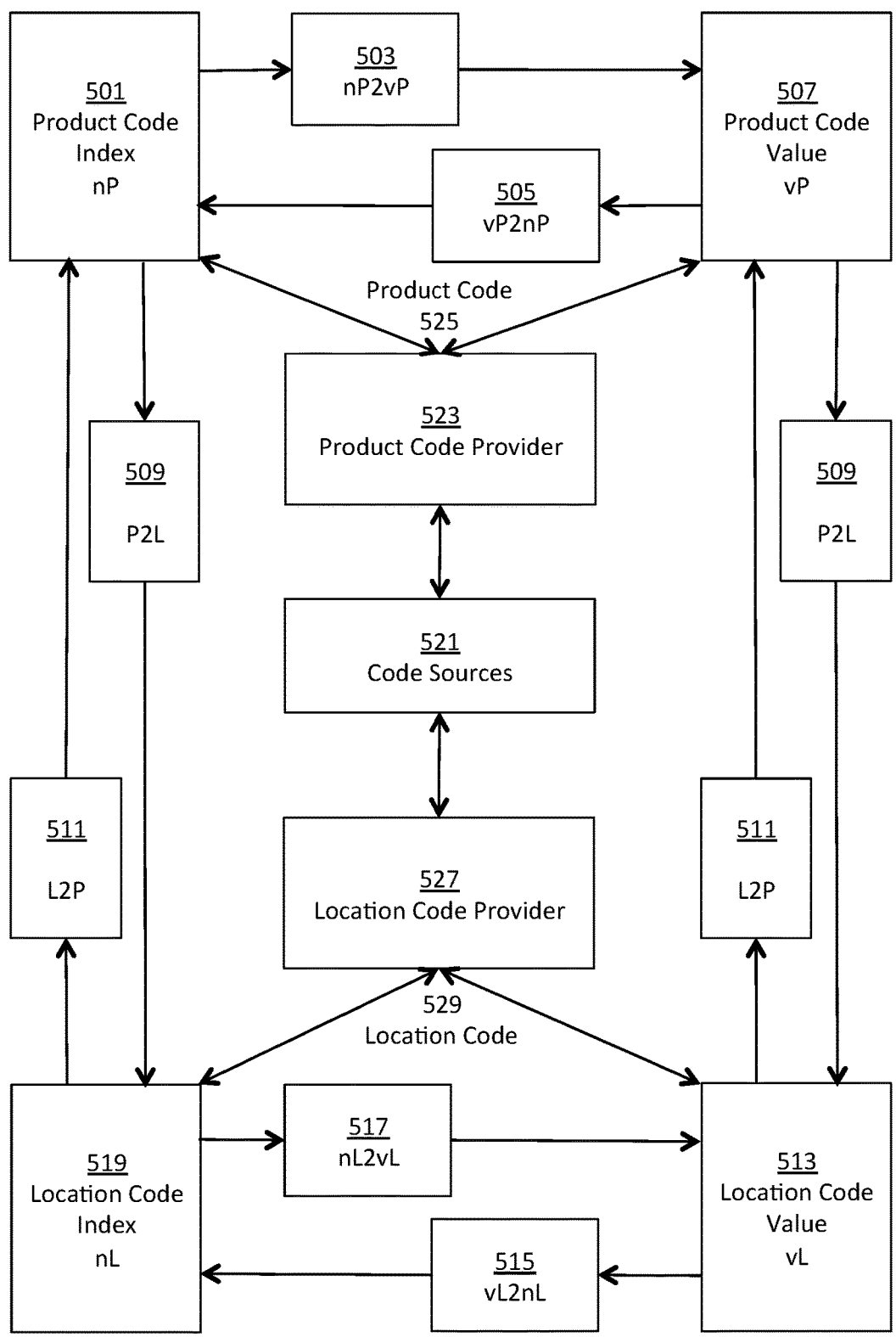
FIG. 5 is a block diagram of a process in which any of three codes may be provided from a fourth code.

Four codes that may be used in the disclosed system are shown at the corners of FIG. 5. From any one of the codes, any of the other codes may be provided. There are two product code types, product code index nP and product code value vP, and two location code types, location code index nL and location code value vL. Beginning at Product Code Index nP 501 and moving in the clockwise direction in FIG. 5, index to value function nP2vP 503 provides Product Code Value vP 507. Product to location map P2L 509 provides location code value vL 513 from vP 507. Location value to location index function vL2 nL 515 provides Location Code Index nL 519 from vL 513. And from vL 513, location to product map L2P 511 provides Product Code Index nP 501, which was the starting code.

Moving in the counterclockwise direction, an alternative example begins at location index nL 519 and moves counter clockwise to function nL2vL 517 that converts nL to vL 513. Map L2P 511 converts vL 513 to vP 507. Function vP2nP 505 converts vP 507 to nP 501. And, map P2L 509 converts nP 501 to nL 519, which was the starting code for this counter clockwise example.

FIG. 5 illustrates that one of the four codes that is received may be converted into any of the three remaining codes by using a single converter or a set of converters. It will be appreciated that the mappings and conversions may be performed by physical converters or by a processor executing instructions programmed into a memory. Referring to the interior or FIG. 5, it is seen that code sources 521 are coupled to a product code provider 523 and to a location code provider 527. The coupling lines are intended to represent bidirectional communication between code sources and code providers. For example, once a code has been provided it becomes available for use by the system to provide other codes. Code sources 521 may provide input to code the provider 527 and the location code provider 527 may provide input to code sources 521.

From code sources 521, there is a path to the product code provider 523 that provides a product code 525, which may be either a product index nP 501 or a product value vP 507. Similarly, from code sources 521 there is a path to the location code provider 527 that provides a location code 529, which may be either a location index 519 or a location value 513.

Considering a different direction of communication, a product code 525 may be input to the product code provider 523 which provides the code to code sources 521, which provides a product code 525 to the location code provider 527, which converts the input product code to a location code 529. Or by taking a different path, a location code 529 may be input to the location code provider 527, which outputs the location code 529 to code sources 521, which provides the location code to the product code provider 523, which converts the location code 529 to a product code 525.

Figure 6A:
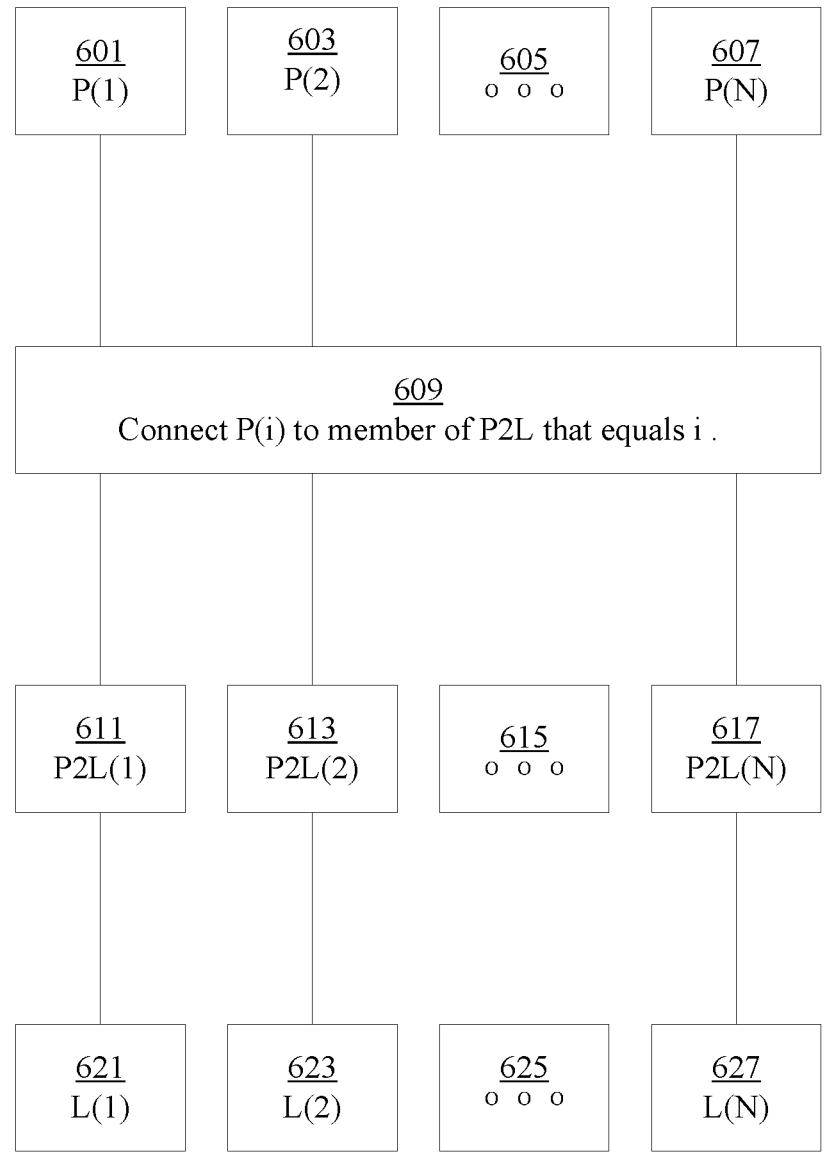
FIG. 6A is a block diagram of a mapping process that provides a location code from a product code.

Detailed operation of the index to value functions, value to index functions, location to product maps, and product to location maps is described in the following descriptions. A mapping process that provides a location code from a product code is shown in FIG. 6A. As previously mentioned, the process is herein often simply called a map. In mathematics the words 'map' and 'function' are often considered to have the same meaning, but for purposes of this disclosure, it is believed useful to give a more specialized meaning to the word 'map'. While the word 'function' has a meaning that may include 'map' or 'mapping', it is intended herein for the word 'map' to have a special meaning related to providing location codes from product codes that are permutations of the location codes and vice versa for providing product codes from location codes that are permutations of the product codes.

Beginning at the top of FIG. 6A, a product code having N members is represented in subscripted form by four blocks $P_1$ 601, $P_2$ 603, $P_N$ 607 and members between $P_2$ and $P_N$ are represented by 'o o o' in the third block 605.

Block 609 is a logic block analogous to a switching device programmed with instructions for connecting product codes $P_1$ through $P_N$ to the proper positions of P2L to graphically connect or map each product code member to its related location code member. Graphically, four blocks represent connecting points for map members $P2L_1$ 611, $P2L_2$ 613, $P2L_N$ 617, and for map members between $P2L_2$ and $P2L_N$ by 'o o o' in block 615. Once a path is established from the product code members to the map members, a path is also established from product code members to corresponding location code members represented by the four blocks $L_1$ 621, $L_2$ 623, $L_N$ 627, and for members between $L_2$ and $L_N$ by 'o o o' in block 625.

Figure 6B:
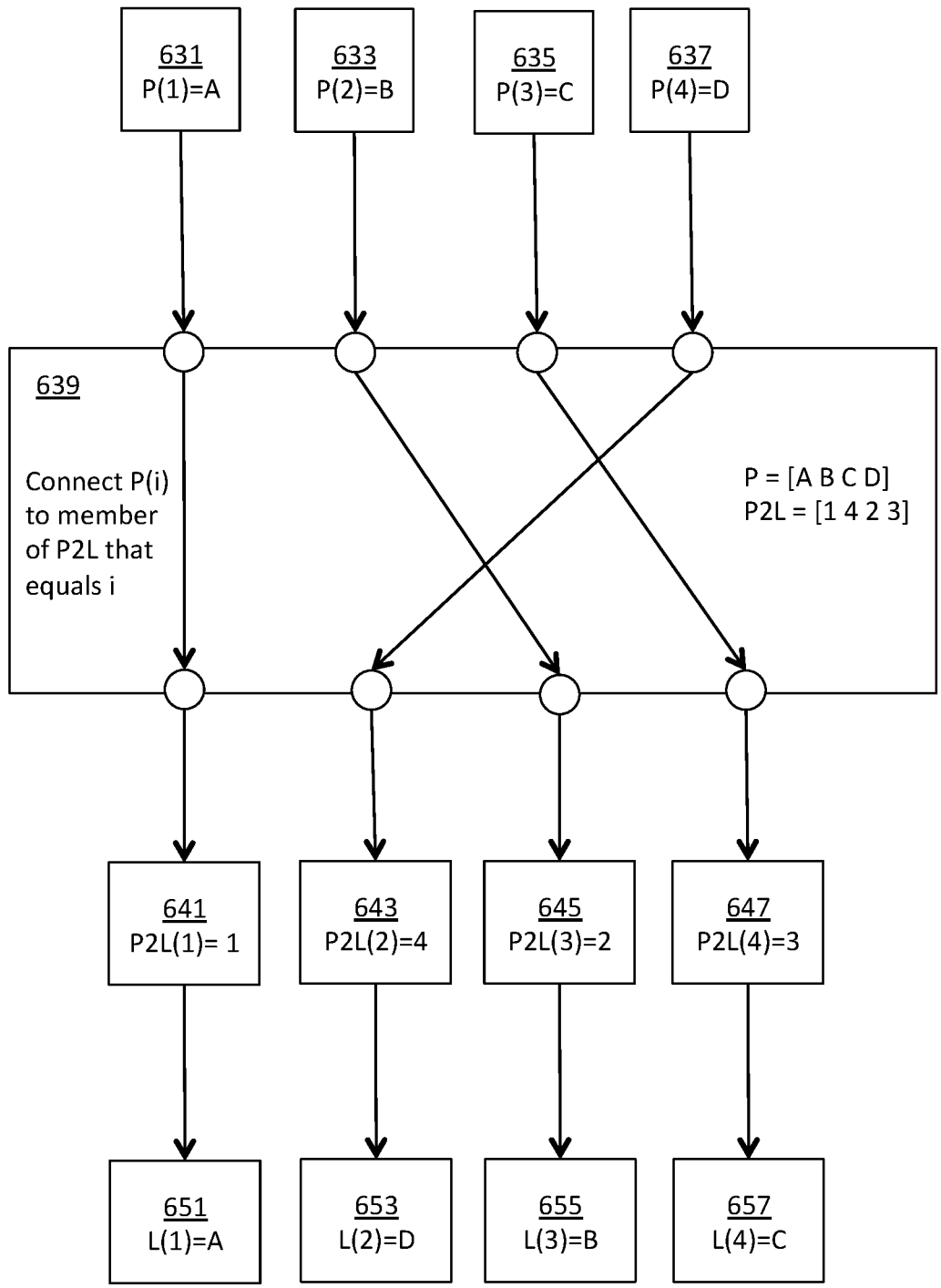
FIG. 6B is a block diagram of a specific example of the mapping process of FIG. 6A.

As an example, illustrated in FIG. 6B, consider the following parameters shown as subscripted variables $P_1$ 631, $P_2$ 633, $P_3$ 635, $P_4$ 637 where P and P2L are defined as:
P=[AB CD]
P2L=[1 4 2 3]
Logic block 639 functions in the manner of a switching device. Programmed instructions in the logic block 639 connect P(1) to the member of P2L=1; that is, connect $P_1$ to the member of P2L that is equal to 1, which is P2L$_1$ 641, since P2L$_1$=1. The instructions connect P$_2$ to P2L=2; that is, P2L$_3$ 645, since P2L$_3$=2. The instructions connect P$_3$ to P2L=3; that is, P2L$_4$ 647, since P2L$_4$=3. The instructions connect P$_4$ to P2L=4; that is, P2L$_2$ 643, since P2L$_2$=4.

Because the members of P2L connect in order to members of L, the result is that:

P$_1$ 631 represents L$_1$ 651;
P$_2$ 633 represents L$_3$ 655;
P$_3$ 635 represents L$_4$ 657; and;
P$_4$ 637 represents L$_2$ 635.

From these relations, it is seen that L is represented by P$_{[1\ 4\ 2\ 3]}$. This result is more simply derived mathematically using subscripted variables from L=P$_{P2L}$=P$_{[1\ 4\ 2\ 3]}$. For code base, index, and value, L=P$_{P2L}$. That is, product code base, index, and value not only represent location code base, index, and value, they are equal after mapping.

It is understood that each member of a product code attribute represents a member of a location code attribute and vice versa, but generally product and location code attributes are not permutations of each other. If any location attribute member has the same name as a product attribute member, it is good practice to either rename one of them or otherwise take care to avoid confusion.

If P is defined in the current example not as a product code attribute but as a product base, index, or value, then the corresponding location base, index, or value is defined by L=P$_{P2L}$. And, since P=[A B C D]:

L=P$_{[1\ 4\ 2\ 3]}$=[A D B C], where A, B, C, and D represent numbers suitable for the code represented.

On the other hand if P is defined in terms of product attribute names:

L$_1$ 651 is represented by product attribute A;
L$_2$ 653 is represented by product attribute D;
L$_3$ 655 is represented by product attribute B; and
L$_4$ 657 is represented by product attribute C.

Notice that these representations are independent of the names of the location code attributes which in this example are not named but represented by L$_1$ through L$_4$.

Figure 6C:
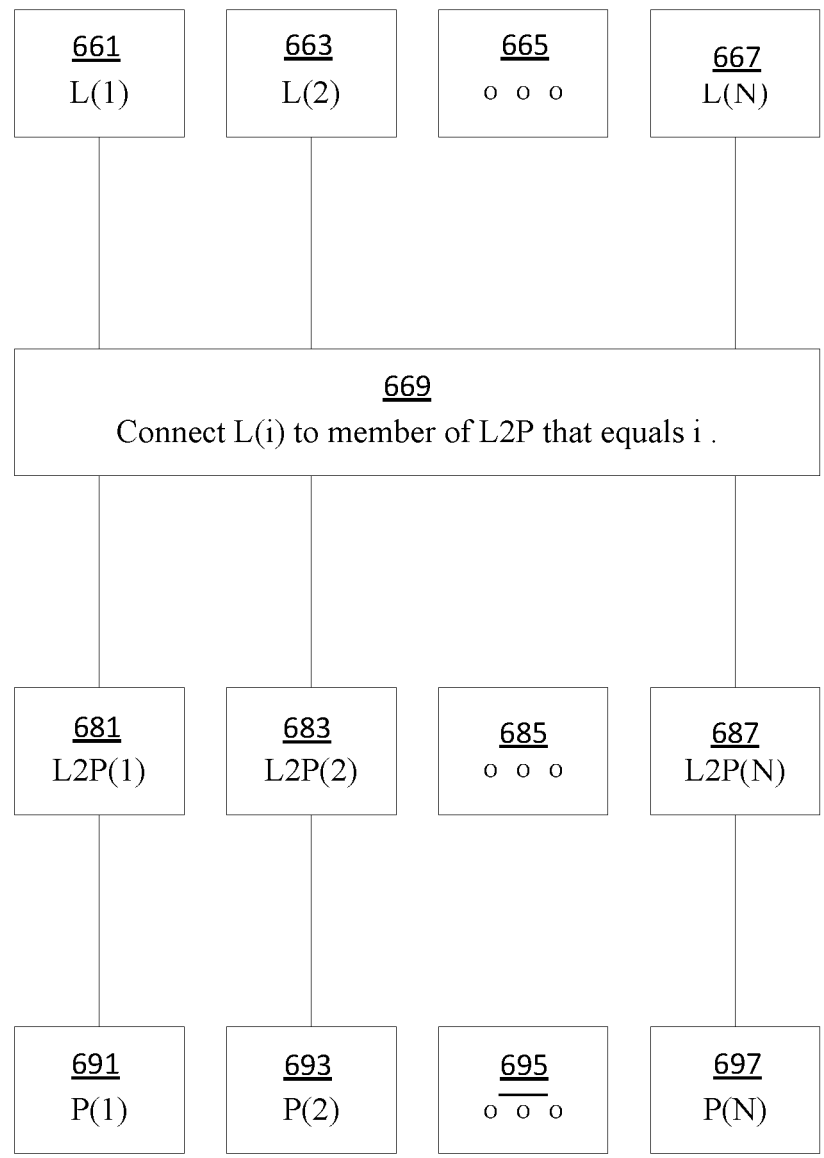
FIG. 6C is a block diagram of a mapping process that provides a product code from a location code.

In FIG. 6C, a process is shown for converting a location code to a product code.

Notice the similarity between FIG. 6C and FIG. 6A with respect to converting a product code to a location code. The types of code shown in FIG. 6C are the same as the types shown in FIG. 6A.

Beginning at the top of FIG. 6C, a location code having N members is represented in subscripted form by four blocks L$_1$ 661, L$_2$ 663, L$_N$ 667 and members between L$_2$ and L$_N$ are represented by 'o o o' in the third block 665. Next, in logic module 669 an instruction is given for connecting product codes L$_1$ through L$_N$ to the proper maps represented by L2P to graphically connect each product code member to its related location code member. Graphically, four blocks represent connecting points for map members L2P$_1$ 681, L2P$_2$ 683, L2P$_N$ 687, and for map members between L2P$_2$ 683 and L2P$_N$ 687 by 'o o o' in block 685. Once a path is established from the location code members to the map members, a path is also established from location code members to product code members represented by the four blocks P$_1$ 691, P$_2$ 693, P$_N$ 697, and for members between P$_2$ and P$_N$ by 'o o o' in block 695.

As an example, consider the following parameters shown as subscripted variables:

L=[E F G H]
L2P=[1 3 4 2]

According to instructions programmed into the logic module 669, connect L$_1$ to the member of L2P equal to i, which is L2P$_1$, since L2P$_1$=1. Next, connect L$_2$ to L2P=2; that is, L2P$_4$, since L2P$_4$=2. Next, connect L$_3$ to L2P=3; that is, L2P$_2$, since L2P$_2$=3. Then, connect L$_4$ to L2P=4; that is, L2P$_3$, since L2P$_3$=4.

Because the members of L2P connect in order to members of P, the result is that:

L$_1$ represents P$_1$;
L$_2$ represents P$_4$;
L$_3$ represents P$_2$; and
L$_4$ represents P$_3$.

From these relations, it is seen that P is represented by L$_{[1\ 3\ 4\ 2]}$. This result is more simply derived mathematically from P=L$_{L2P}$=L$_{[1\ 3\ 4\ 2]}$.

For code base, index, and value, P=L$_{L2P}$. That is, product code base, index, and value not only represent location code base, index, and value, they are equal after mapping.

A previously mentioned, it is understood that each member of a product code attribute represents a member of a location code attribute and vice versa. If it is assumed that P is defined in the current example as a product, base, index, or value, then the corresponding location base, index or value is defined by L=P$_{P2L}$. Since L=[E F G H]:

P=L$_{[1\ 3\ 4\ 2]}$=[E G H F], where E, F, G, and H represent numbers suitable for the code represented.

On the other hand if L is defined in terms of location attribute names:

P$_1$ is represented by location attribute E;
P$_2$ is represented by location attribute G;
P$_3$ is represented by location attribute H; and
P$_4$ is represented by location attribute F.

Notice that these representations are independent of the names of the product code attributes which in this example are not named but represented by P$_1$ through P$_4$.

A convenient relation for converting between L2P and P2L for maps that are permutations of each other is given by the relation:

L2P$_{P2L}$=P2L$_{L2P}$=1:length of P2L.

For example, in the previous examples, where P2L was defined as P2L=[1 4 2 3], L2P is derived from:

L2P$_{P2L}$=L2P$_{[1\ 4\ 2\ 3]}$=1:length of P2L=[1 2 3 4].

Using this relation, each member of L2P is mapped as follows:

L2P$_1$=1, L2P$_4$=2, L2P$_2$=3, and L2P$_3$=4, so L2P=[1 3 4 2].
Similarly, from L2P=[1 3 4 2]:
P2L$_{[1\ 3\ 4\ 2]}$=[1 2 3 4], so P2L=[1 4 2 3], as expected.

Figure 7:
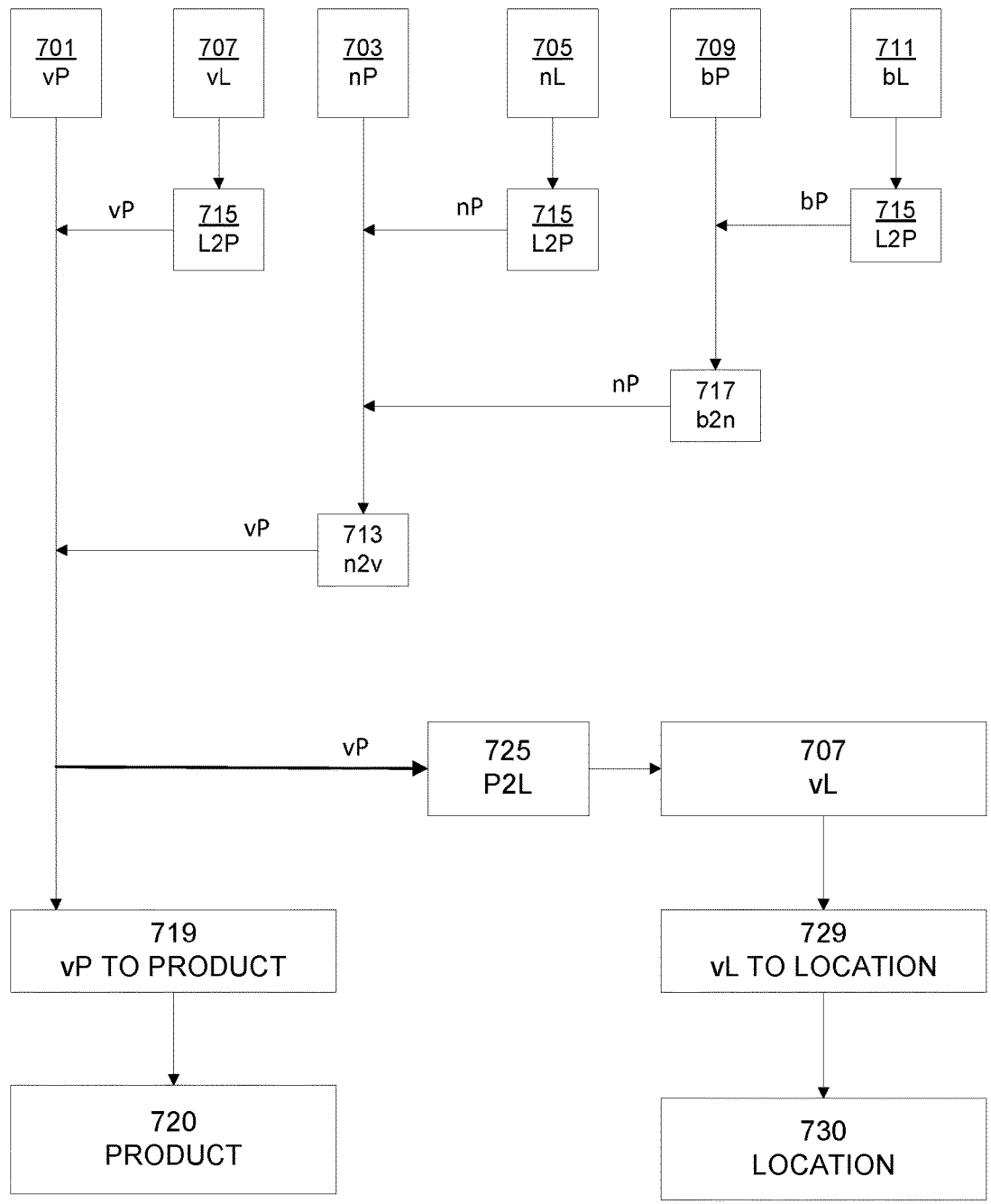
FIG. 7 is a block diagram of a process for providing a product and a location from any one of six input codes.

A block diagram of a process for providing a product and a location from any one of six input codes is shown in FIG. 7. At the top of the figure the six codes are shown. Product code value vP 701 is input to vP to product provider 719 to provide product 720. This product code value 701 is also input to product to location code map P2L 725 to provide location code value vL 707 from which vL to location provider 729 provides location 730. Thus, a product and a location are both provided from vP 701.

Moving back to the top of FIG. 7, it is seen that location code value vL 707 is converted to product value vP 701 by operation of location code to product code map L2P 715. As previously described, product 720 and location 730 are provided from the product value and, thus, from vL 707. Notice that vL 707 was converted to vP 701 using L2P 715 and then converted back to vL 707 using P2L 725 for input to vL to location provider 729.

Referring again to the top of FIG. 7 it is seen that product code index nP 703 is converted to vP 701 by index to value function n2v 713. And again, product 720 and location 730 are provided. Once more referring to the top of FIG. 7, it is seen that location code index nL 705 is converted to product code index nP 703 from which product 720 and location 730 are provided as previously described. Back to the top again, it is seen that product code base bP 709 is input to base to index function b2n 717 which provides nP 703 which as previously described provides product 720 and location 730. Notice that product base 709 provides a sequence of product indexes generally greater than one. As a result, product and location bases provide sequences of indexes which are used to provide sequences of values from which sequences of products and locations are provided. The last code at the top of FIG. 7 is location base bL 711 which is input to location to product map L2P 715 which provides product base bP 709, which as previously described provides a sequence of products and locations.

In summary the diagram in FIG. 7 illustrates how a product and a location may be both provided from a product code value 701, a location code value 707, a product code index 703, a location code index 705, a product base 709, or a location code base 711.

As mentioned previously, products and locations are provided from code values, and code values are provided from code indexes. A sequence of code indexes is provided from a code base, generally a mixed number base. The relation between an index and a value is determined by a control function which in mathematical terms is often either a linear function or a nonlinear function. FIG. 8 illustrates symbols and relations for a linear control function.

On the left side of FIG. 8, symbols are defined to simplify the appearance of the mathematical relations that relate indexes and values. As indicated, v=Value, n=Index, b=Base, F=First Value, and L=Last Value. Also, multiplication is indicated by the asterisk "*", and division is indicated by the forward slash "/".

When the base b is greater than one, the relation 801 for converting an index to a value is:

$$v=F+n*(L-F)/(b-1).$$

An attempt to divide by zero is avoided by defining:
for b=1, v=F.

When the base b is greater than one, the relation 803 for converting a value to an index is:

$$n=(v-F)*(b-1)/(L-F).$$

For b=1, n=0.

When the base b is greater than one, it can be calculated from relation 805 as:

$$b=1+n*(L-F)/(v-F).$$

When the base b is greater than one, the first value F is given by relation 807:

$$F=v(0)$$

and when b=1, F=L.

Finally when the base b is greater than one, the last value L is given by relation 809:

$$L=v(b-1);$$

and when b=1, L=F.

Indexes are provided from number bases in two ways. The first way is by counting from one index to the next. For example, in the decimal number system it is common to count from zero to nine using each of the ten digits. After reaching nine in any position, the next number is formed by carrying one to the next position on the left that can be incremented and setting to zero all numbers to the right of the incremented position, such as 8, 9, 10, 11, ..., 19, 20, 21, ..., 99, 100, and so on.

Similarly, in a base three system, an index sequence is provided by counting from zero to two using each of the three digits. After reaching two in any position, the next number is formed by carrying one to the next position on the left that can be incremented and then setting to zero all numbers to the right of the incremented position, such as 0, 1, 2, 10, 11, 12, 20, ... 100, ..., 222, 1000. This base three sequence corresponds to a decimal sequence of twenty-eight members from zero to twenty seven.

In conventional number systems, the number of numbers that can be represented is unlimited. That is, the number of indexes provided from a conventional number base is unlimited. On the other hand, a mixed number base used herein provides a finite number of indexes. For example, consider b=[2 1 3] which provides an index sequence from 000 to 102 for a total of six indexes. The sequence is: 000, 001, 002, 100, 101, and 102. The maximum number of indexes provided by a mixed base is the multiplicative product of the base members, which, in this example for b=[2 1 3], is 2 times 1 times 3 equals 6.

Counting in a mixed base system is almost the same as counting in a conventional system, except that each position has a maximum value independent of any other position and the number of positions is the same as the number of positions in the mixed base. This means that a base of length N provides indexes of length N, where N is an integer greater than zero.

A second way of providing indexes from a number base is to generate a sequence of integers in one base and then convert to the desired base. For example, it is often convenient to generate a sequence of decimal integers and then convert them to a mixed base number. It is also often convenient to convert a mixed base number to a decimal number.

Figure 9:
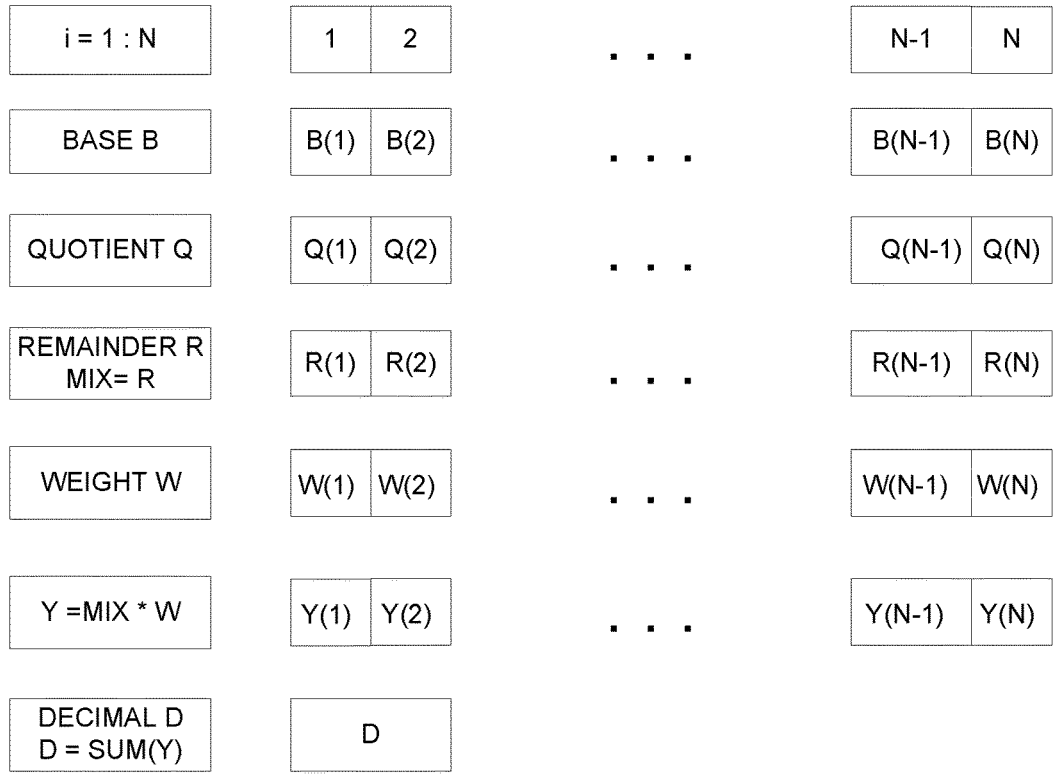
FIG. 9 is a guide for converting between mixed base numbers and decimal numbers.

FIG. 9 provides a guide to converting between mixed base and decimal numbers.

Consider a mixed base B of arbitrary length N, where N is greater than zero. Also, consider a subscript "i" which ranges from 1 to N. Enter base B from $B_1$ to $B_N$. Enter the decimal integer to be converted at $Q_N$. For i=N:−1:2 (that is, for i equals N to 2 in steps of −1), calculate and enter the integer quotient $Q_{i-1}$ using:

$$Q_{i-1}=Qi/B_i.$$

For i=N:−1:2, calculate and enter the remainder $R_i$ using:

$$R_i=Q_i-B_i*Q_{i-1}, \text{ and set } R_1=Q_1.$$

MIX=R=Mixed Base representation of the decimal integer entered at $Q_N$.

For i=N:−1:2 calculate and enter $W_i$ using:

$$W_N=1 \text{ and } W_{i-1}=W_i*B_i.$$

Set Y=MIX*W which is the same as $Y_i=MIX_i*W_i$ for i=1:N. Calculate the decimal number from:

$$\text{Decimal}=\text{Sum}(Y).$$

Notice that the steps following the calculation of the mixed base number from MIX=R are used to convert a mixed base number to decimal or to verify that the conversion of MIX to decimal provides the decimal that had been converted to MIX.

Mixed base numbers simplify methods of providing sequences of product indexes that are conveniently converted to product values from which products are provided by a product provider. Since mixed base numbers are conveniently represented by decimal numbers, it is convenient for designers to design systems that provide product sequences that are ranked by decimal numbers and generally more easily understood by human users than rankings represented in other number bases. Some particular products well suited for the system described herein are books of books and collections of books of books, such as where the contents of the books and collections may be sequences of shapes and books of shapes.

Figure 10:
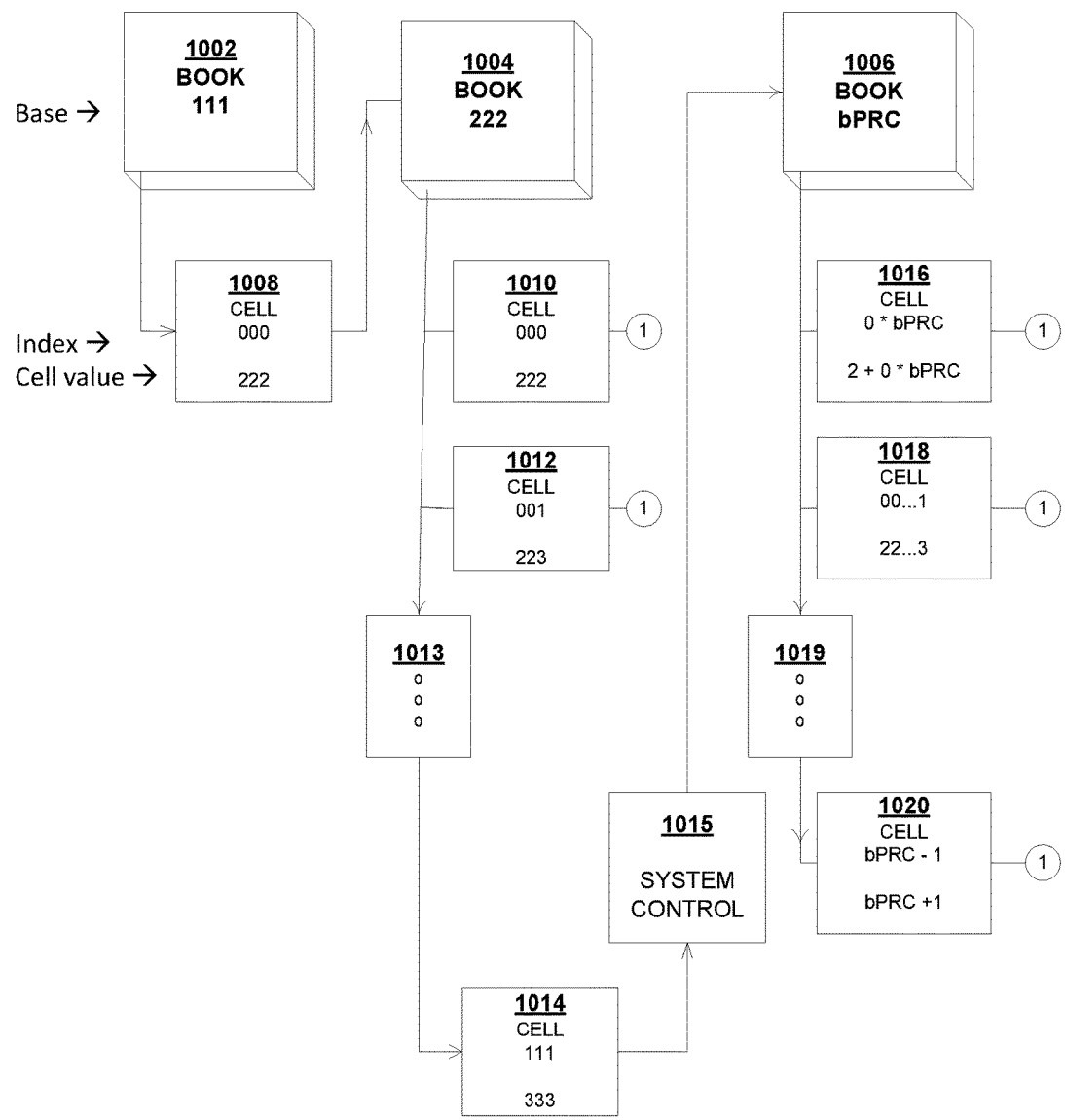
FIG. 10 is a block diagram of a system for providing books of books.

A system for providing a sequence or book of books from a first book that has one page with one row and one column is shown in FIG. 10. Book 1002 is provided from a book code number base that defines the number of states for page, row, and column. A code base is represented generally by bPRC and specifically for Book 1002 by bPRC=[1 1 1]. This means that page base bP=[1], row base bRow=[1], and column base bC=[1]. For our purposes, this base represents the most simple book and is considered to be the first book. It seems reasonable to represent the second book by bPRC=[1 1 2], but it may be difficult to rank books after the second book because there are many ways to provide a logical book sequence of three or more books. For example, the third book might be represented by bPRC=[1 1 3] or perhaps by bPRC=[1 3 1]. A book of books contains a number of books equal to the multiplicative product of bPRC. For example, Book 1004 is provided from bPRC=[2 2 2] that produces an index sequence of length eight from [0 0 0] to [1 1 1], so it is convenient to rank the books in a given book of books, and in general it is convenient to rank a sequence of books provided by a defined number base bPRC.

Ranking helps users know where a selected book fits in a sequence of books and the books may be numbered for convenience by decimals from zero to N−1, where N is the number of books in the sequence. Beginning with book 1002, which is identified by and provided from bPRC=[1 1 1], it is seen that the book has only one cell 1008. The cell has index [0 0 0], the only index provided from base [1 1 1]. A cell value derived or provided from the index is value [2 2 2], and it is set equal to a new base bPRC[d]=[2 2 2] for providing a descendent book 1004. The descendant book code base [2 2 2] provides a sequence of eight cells indexed from [0 0 0] to [1 1 1]. The first cell 1010 having index [0 0 0] and value [2 2 2] is shown along with the second cell 1012 having index [0 0 1] and value [2 2 3]. The last cell 1014 provided from base [2 2 2] has index [1 1 1] and value [3 3 3]. Between cell 1012 and cell 1014, block 1013 represents indexes between 001 and 111, namely 010, 011, 100, 101, and 110, to complete the eight indexes provided from book 1004 provided from bPRC=[2 2 2]. Book 1004 has two pages, each page having two rows and two columns. The first page with page index nP=0 has four cells indexed 000 (cell 1010), 001 (cell 1012), 010 (not shown), and 011 (not shown). The second page with page index nP=1 also has four cells but they are indexed 100 (not shown), 101 (not shown), 110 (not shown), and 111 (cell 1014). For each cell shown in FIG. 10, the cell index is shown directly below the word "cell". Then, below the cell index is shown the value from which a descendent book is provided by a value to book provider.

Moving on from cell 1014 with value 333, a system control 1015 may intervene to modify the method used to provide a new bPRC. Although the system has control and intervention may be appropriate at any time, it is placed at this location in FIG. 10 to continue the previous description without interruption. As indicated by note 1 in FIG. 10, an index to value control function may be applied to any of the cell indexes in a book to derive a value for bPRC[d] for a new descendent book. For clarity in the illustration of FIG. 10, a system control 1015 is applied only to the value of the last cell 1014 of the second book 1004.

Based on the system control 1015, it is shown that a cell value equals the cell index plus two as in the relation v=n+2. In other words, the control function that converts index n to value v is v(n)=n+2. This control function is one of the simpler functions with one exception. The exception is v(n)=n+1 for situations where users begin with a base for bPRC that provides all the indexes desired for any expected application.

Notice that for v=n+2, a book of books contains one or more descendent books that have more cells than the parent book. On the other hand, for v=n+1, the largest descendent book contains the same number of cells as the parent and any other descendent books contain fewer cells than the parent.

Referring again to cell 1014 with a value 333 that provides base bPRC for another book, it is seen that system control 1015 intervenes. A typical intervention might change the length of the base bPRC so that P=[P(1) P(2)] and bPRC=[1 1 1 1]. In general P may be defined as P=[$P_1$ $P_2$ . . . $P_N$] or more compactly as P=(1:N) where N is the desired number of page attribute instances used to represent P. In a similar way the lengths of R and C can be changed.

The length of a code base can be changed between one and a number greater than one without changing the number of indexes provided by the base. The length of a code base is increased by inserting ones and by factoring composite numbers in the base. The base length is decreased by removing ones and by combining members of the code base to form composite numbers. As an example, given a code base of length N, combining the first and second members by multiplying them together produces a code length of N−1, repeating gives N−2, and so on until only one member remains, resulting in a code base length of one.

Using methods of inserting and removing ones along with factoring composite members and combining members to form composite members, any code base length can be adjusted to any length greater than zero. One fortunate result of using such methods is that the length of a location code base is conveniently adjusted to the length of any desired product code base.

Figure 11:
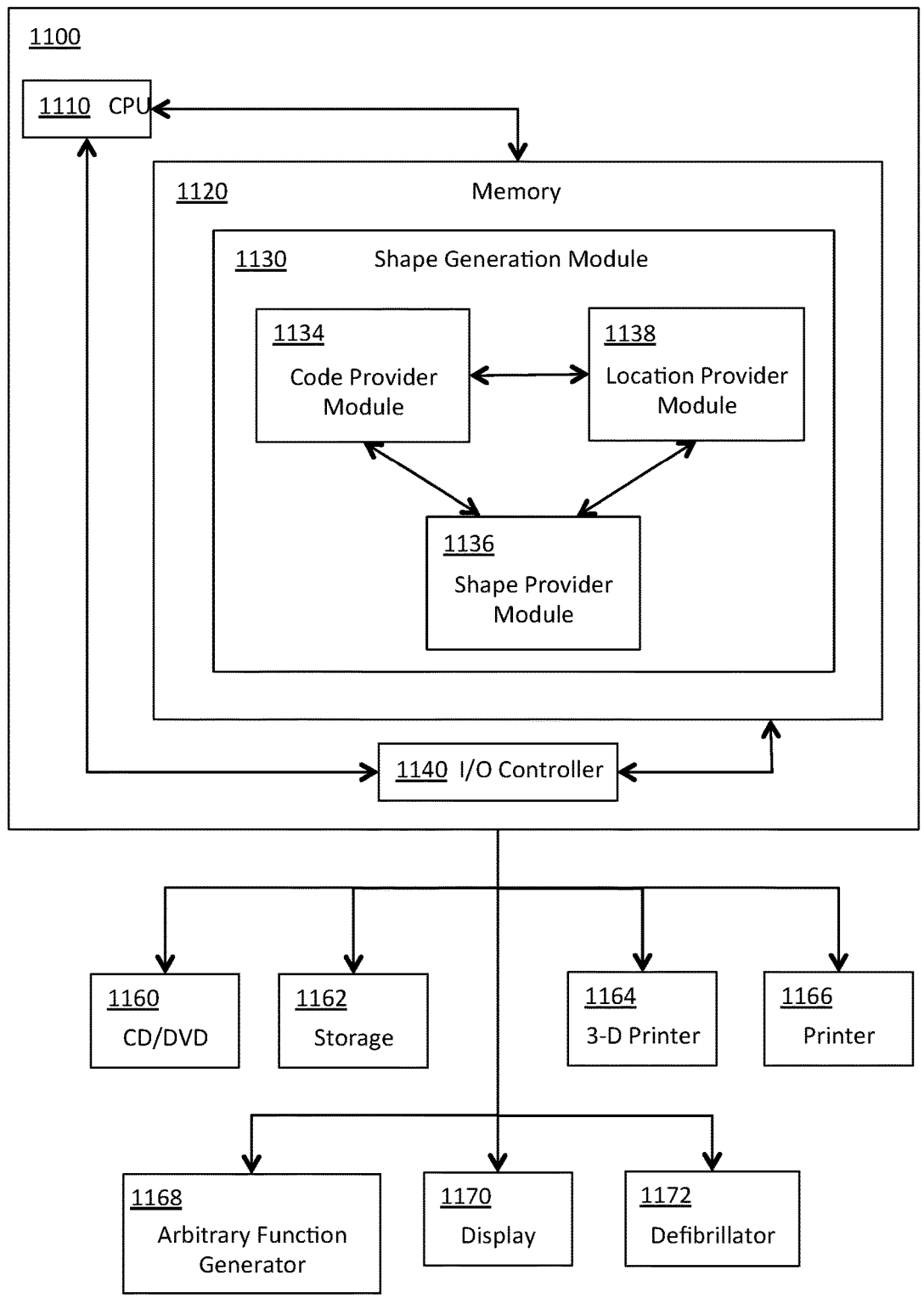
FIG. 11 is a block diagram of a computing system in which shapes are generated and output.

FIG. 11 illustrates an architectural diagram of a computing system 1100 executing a shape generation module. Computing system 1100 at least comprises a processor or CPU 1110, a memory 1120, and an I/O controller 1140. One skilled in the art realizes that other computing systems may include additional components; however, for simplicity only the above components are illustrated. A shape generation module 1130 may be stored in the memory 1120 with the module's processes and instruction being executable by the CPU 1110. In one embodiment, the shape generation module 1130 may comprise one or more of a code provider module 1134, a shape shape provider module 1136, and an optional location provider module 1138. As illustrated in FIG. 11, each module is capable of bilateral communication with the other modules.

The CPU 1110 and the memory 1120 communicate with the I/O controller 1140 so that an output of the shape generation module, such as a product code value, may be directed to at least one connected peripheral device, such as the peripheral devices illustrated in FIG. 11: a CD/DVD drive 1160, other storage 1162, a 3D printer 1164, a traditional printer 1166, an arbitrary function generator 1168, a display 1170, or a defibrillator 1172. If the output of the waveform generation module 1130 is directed to the CD/DVD drive 1160, the content may be written to a CD/DVD disk. If the output of the module 1130 is directed to the printer 1166, the content may be printed to one or more tangible mediums such as printer paper or photo paper. If the output of the module 1130 is directed to the 3D printer 1164, a 3D model of the content may be created. The output of the module 1130 may also be communicated to the arbitrary function generator 1168 and passed on to a device receiving signals from the arbitrary function generator 1168. Additionally, the output of the module 1130 may also be displayed on the display device 1170. Lastly, the output of the module 1130 may be directed to the defibrillator 1172. Other peripheral devices may be used to receive the output (e.g., a shape data file) of the shape generation module 1130, such as: a hard drive, a flash drive, other computer readable data storage mediums, a mobile device, and a signal generator, to name a few.

Figure 12:
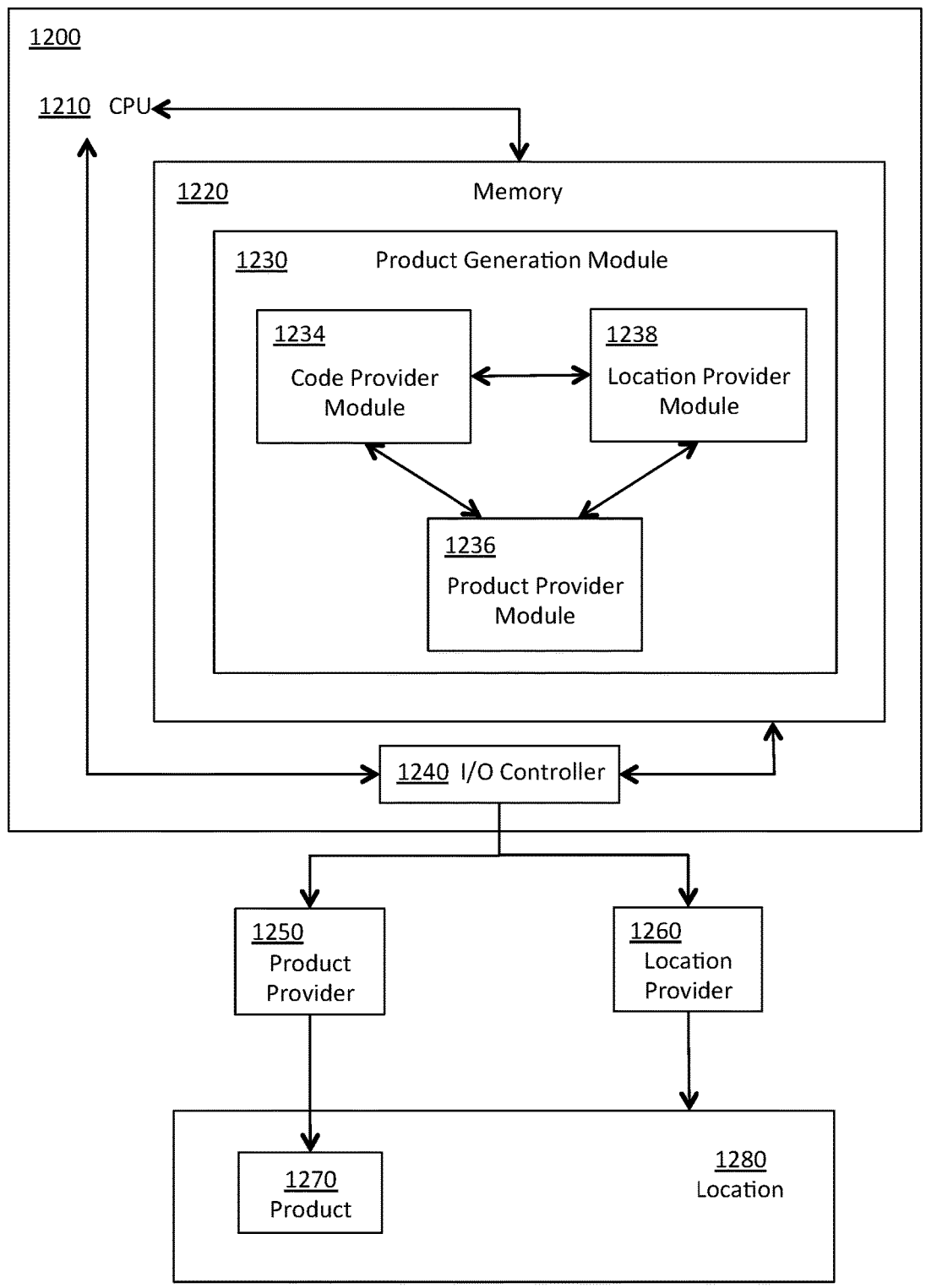
FIG. 12 is a block diagram of a computing system in which products are generated and output.

More generally, FIG. 12 illustrates an architectural diagram of a computing system 1200 executing a product generation module. Computing system 1200 at least comprises a processor or CPU 1210, a memory 1220, and an I/O controller 1240. One skilled in the art realizes that other computing systems may include additional components; however, for simplicity only the above components are illustrated. A product generation module 1230 may be stored in the memory 1220 with the module's processes and instruction being executable by the CPU 1210. In one embodiment, the product generation module 1230 may comprise one or more of a code provider module 1234, a product provider module 1236, and a location provider module 1238. As illustrated in FIG. 12, each module is capable of bilateral communication with the other modules. The CPU 1210 and the memory 1220 communicate with the I/O controller 1240 so that an output of the product generation module, such as a product code value, may be directed to a product provider 1250 and/or a location provider 1260. The product provider 1250 may provide a product 1270 to a location 1280.

Figure 13:
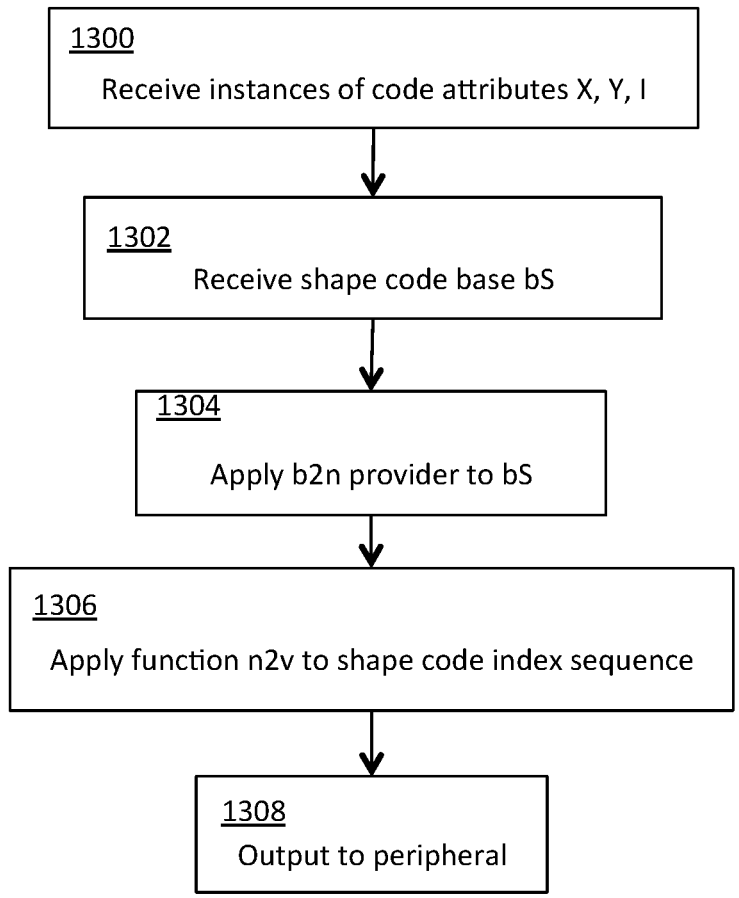
FIG. 13 is a flow chart of a method of generating a shape sequence.

FIG. 13 is a flow chart of a method of generating a sequence of shapes. A number of instances L of each code attribute X, Y, I are received (step 1300), where X represents horizontal coordinates, Y represents vertical coordinates, and I represents interpolation methods, and where each instance of [X Y I] defines one of L break points P of a shape S. A shape code base bS=[bX bY bI] is received (step 1302) defining a number of states of each code attribute, where code base $bX=[bX_1\ bX_2\ \ldots\ bX_L]$, code base $bY=[bY_1\ bY_2\ \ldots\ bY_L]$, and code base $bI=[bI_1\ bI_2\ \ldots\ bI_L]$. A code base to index provider b2n is applied to shape code base bS to generate a shape code index sequence (step 1304). An index to value control function n2v is applied to the generated shape code index sequence to generate a shape value sequence $S=X_{1:L}, Y_{1:L}, I_{1:L}$ is (step 1306) which is output to a peripheral device (step 1308).

Embodiments of the invention described herein may be implemented as logical steps in one or more computer systems. The logical operations of the present invention may be implemented (1) as a sequence of processor-implemented steps executing in one or more computer systems or (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, unless explicitly claimed otherwise or if a specific order is inherently necessitated by the claim language.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for providing a product sequence, the system comprising:
   a computer;
   an input coupled to the computer and configured to receive a first product code base that defines a number of states for each member of a product code having a first plurality of members;
   a product code base changer coupled to the computer and configured to convert the first product code base to a new product code base having a second plurality of members different from the first plurality;
   an output coupled to the computer and configured to provide a product sequence from the new product code base.

2. The system of claim 1 wherein the product code base changer removes ones (1's) from the first code base to provide the new code base.

3. The system of claim 1 wherein the product code base changer inserts ones(1's) into the first code base to provide the new code base.

4. The system of claim 1 wherein the product code base changer multiplies together two or more members of the first code base to provide the new code base.

5. The system of claim 1 wherein the product code base changer factors composite members into two or more members to provide the new code base.

6. A method for providing a product sequence, the system comprising:
   receiving in a computer a first product code base that defines a number of states for each member of a product code having a first plurality of members;
   converting in the computer the first product code base to a new product code base having a second plurality of members different from the first plurality;
   converting in the computer a product sequence from the new product code base;
   outputting from the computer the product sequence from the new product code base.

7. The method of claim 6 wherein converting the first product code base to the new product code base comprises removing ones (1's) from the first code base to provide the new code base.

8. The method of claim 6 wherein converting the first product code base to the new product code base comprises inserting ones(1's) into the first code base to provide the new code base.

9. The method of claim 6 wherein converting the first product code base to the new product code base comprises multiplying together two or more members of the first code base to provide the new code base.

10. The method of claim 6 wherein converting the first product code base to the new product code base comprises factoring composite members into two or more members to provide the new code base.

\* \* \* \* \*